United States Patent [19]

Gyugyi et al.

[11] Patent Number: 4,488,216
[45] Date of Patent: Dec. 11, 1984

[54] UNRESTRICTED FREQUENCY CHANGER SYSTEM AND ADJUSTABLE FREQUENCY AC MOTOR DRIVE USING SUCH A SYSTEM

[75] Inventors: Laszlo Gyugyi, Penn Hills; Miklos Sarkozi, Murrysville, both of Pa.

[73] Assignee: Westinghouse Electric Corp., Pittsburgh, Pa.

[21] Appl. No.: 490,079

[22] Filed: Apr. 29, 1983

[51] Int. Cl.³ ............................................ H02M 5/257
[52] U.S. Cl. ..................... 363/160; 318/800; 318/810
[58] Field of Search .............. 363/10, 65, 159–162, 363/164–165; 318/799–800, 806–807, 810–812, 345 C, 345 E, 345 G; 307/252 C

[56] References Cited

U.S. PATENT DOCUMENTS

| | | | |
|---|---|---|---|
| 3,470,447 | 9/1969 | Gyugyi et al. | 363/160 X |
| 3,493,838 | 2/1970 | Gyugyi et al. | 363/160 X |
| 3,886,430 | 5/1975 | Meier | 318/807 X |
| 3,902,112 | 8/1975 | Cordier | 363/160 |
| 3,970,914 | 7/1976 | Salzmann et al. | 318/812 X |
| 4,008,428 | 2/1977 | Waldmann et al. | 363/160 |
| 4,017,744 | 4/1977 | Johnson | 363/160 X |
| 4,074,348 | 2/1978 | Salzmann et al. | 363/160 |
| 4,338,558 | 7/1982 | Okamatsu et al. | 318/811 X |

*Primary Examiner*—Peter S. Wong
*Attorney, Agent, or Firm*—C. M. Lorin

[57] ABSTRACT

In a static frequency changer controlled by adjusting the time of conduction of the bilateral switching units forming static converters, the time of conduction is split into n time intervals of conduction of respective subdurations adding-up to be equivalent to the effective time of conduction of the controlled switching unit, and such subdurations are spread and distributed throughout the time period of control of the switching unit within the original switching pattern of the converters, thereby to improve the quality of the output and input currents.

4 Claims, 17 Drawing Figures

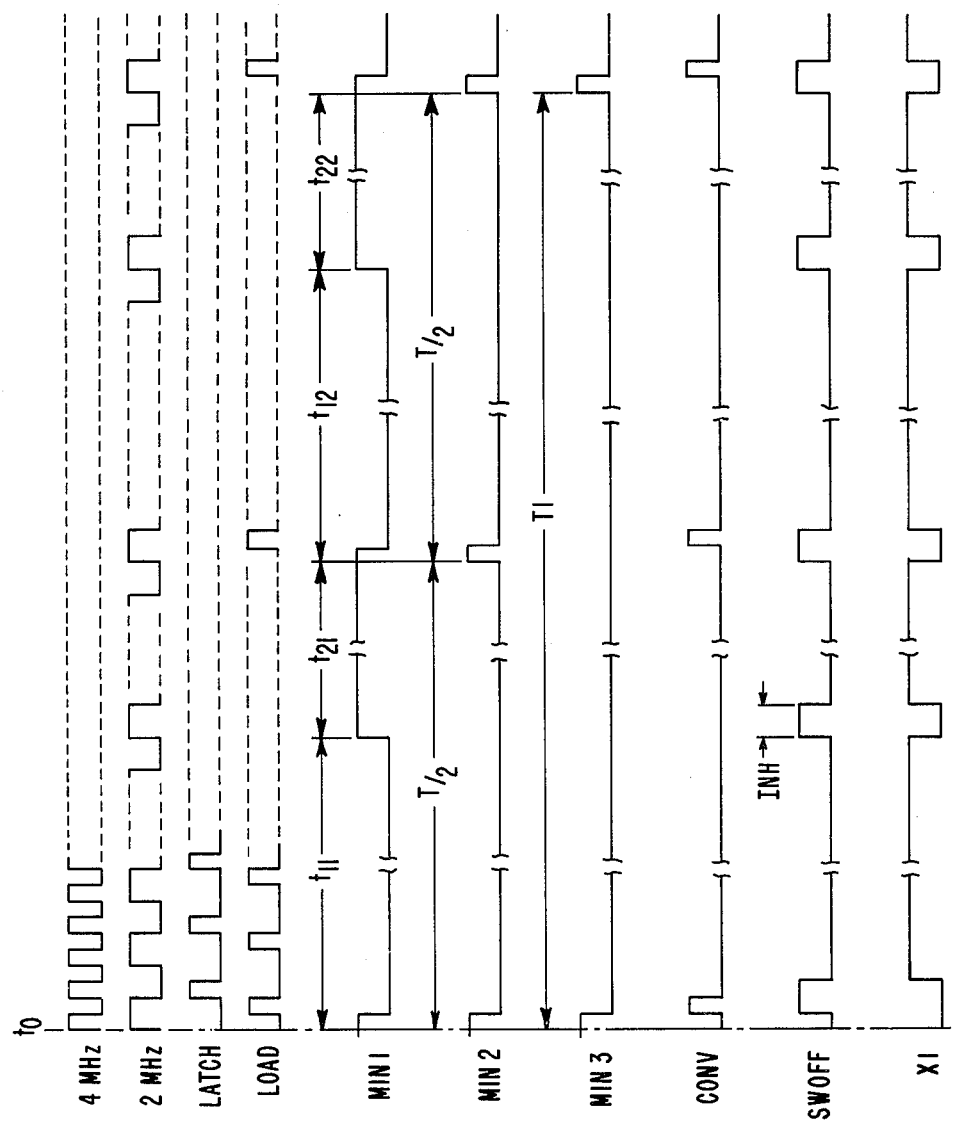

UNRESTRICTED FREQUENCY CHANGER SYSTEM AND ADJUSTABLE FREQUENCY AC MOTOR DRIVE USING SUCH A SYSTEM

BACKGROUND OF THE INVENTION

The invention relates to static power frequency changers in general, and more particularly to Unrestricted Frequency Changers (UFC) and their applications, for instance to adjustable speed AC motor drives.

The Unrestricted Frequency Changer (UFC) and its adjunct static switch control for the generation of an AC wave of controlled voltage and frequency have been described in U.S. Pat. No. 3,470,447 and No. 3,493,838 of L. Gyugyi et al. These patents show how the switches in each of the static converters associated with an output phase of the load can be selectively and cyclically controlled for conduction during a predetermined time interval so as to derive and output power defined by a controlled increment of the input voltage, itself delineated between two time intervals are used for shorting the output, which process results in an AC output voltage having a frequency depending upon the repetition rate of the conduction time intervals and a magnitude measured by the time period of effective conduction of each static switch. Such an unrestricted frequency changer is advantageously applied in variable speed AC drives as explained on pages 5-14, and 363-383 of "Static Power Frequency Changers" by L. Gyugyi and B. R. Pelly, published by John Wiley & Sons 1976. In this regard, for instance, Gyugyi and Pelly have observed that the UFC has an inherent bilateral characteristic between the power source at its input and the power supply at its output, which allows a four-quadrant operation of the motor drive without costly additional circuitry.

The unrestricted frequency changer technique has become particularly attractive with the advent of modern bilateral switches, for instance, power transistors, and GTO devices.

SUMMARY OF THE INVENTION

The present invention resides in controlling the bilateral switches of an Unrestricted Frequency Changer (UFC), each switch upon its turn, within the switching cycle of the output phase so as to repeatedly and alternatively perform one elementary conduction time interval and one succeeding shorting time interval a predetermined number of times with each switch and at distributed instants within the time period of operation of the particular bilateral switch, thereby to improve the quality of the output current.

Such control of the bilateral switches is accomplished digitally. The allocation of elementary conduction time intervals to each bilateral switch and their distribution throughout the time period thereof are performed in accordance with a model which is taking into account the intended frequency and voltage at the output.

Digital techniques are used in order (1) to maintain a constant ratio between output voltage and frequency for constant airgap flux when applied to an induction motor;

(2) to provide substantially the same voltage increment as in a UFC of the prior art while selecting and allocating a number of elementary time intervals of conduction per bilateral switch which equates with one time interval of conduction in the prior art, within the switching cycle per phase of the AC output wave.

BRIEF DESCRIPTION OF THE DRAWINGS

FIG. 16 shows the time relationship of the key signals in the digital control circuit of FIG. 12.

DETAILED DESCRIPTION OF THE INVENTION

Figure 1:
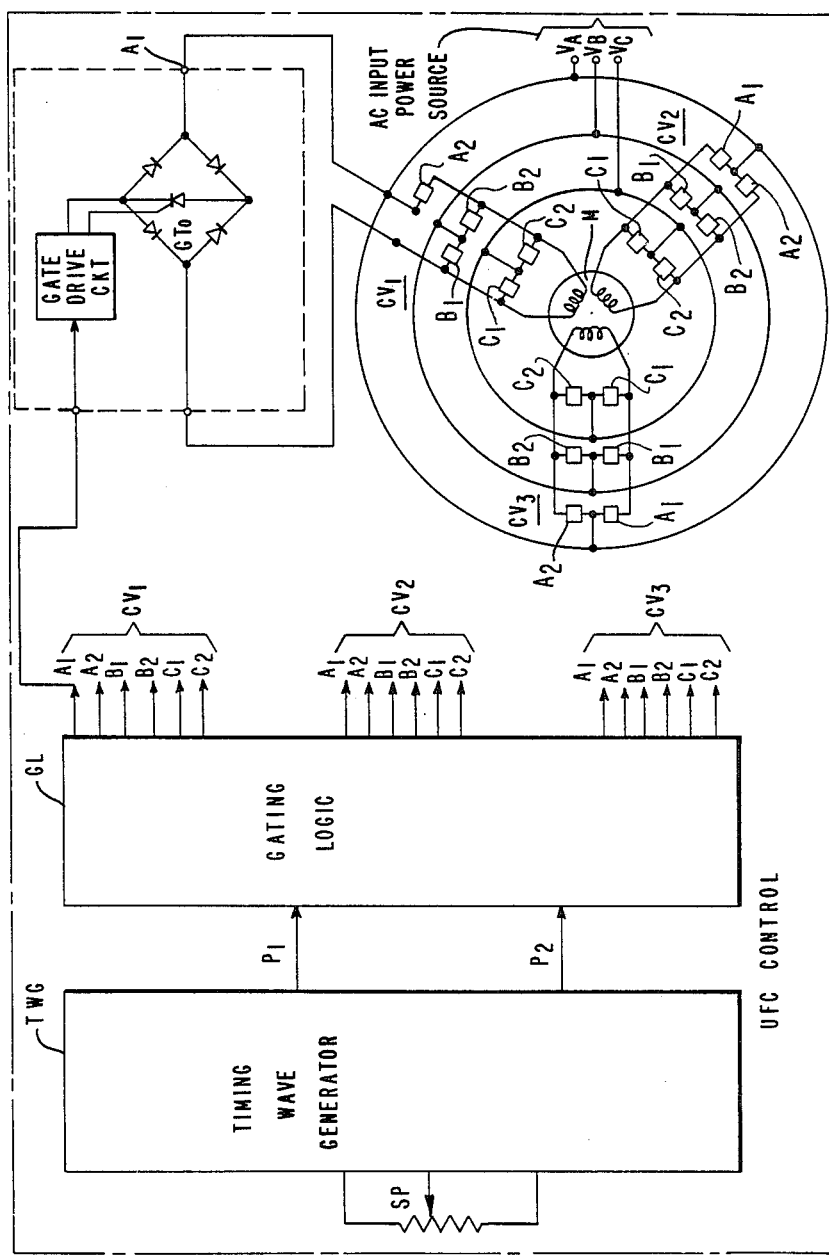
FIG. 1 is a block diagram of an UFC motor drive system according to aforementioned U.S. Pat. Nos. 3,470,447 and 3,493,838.

For the purpose of illustration the invention will be described as part of an AC drive system. It is understood, however, that the Unrestricted Frequency Changer (UFC) according to the invention can be used in a variety of industrial and other applications.

In the AC drive system of the preferred embodiment of the invention an Unrestricted Frequency Changer (UFC) is used to provide variable frequency-variable voltage output power to control the speed of an AC induction motor. In keeping with the volt-per-hertz characteristic of the induction motor, the fundamental output voltage is varied essentially in proportion with the output frequency. Such variation of the output voltage had been achieved up to now by simple pulse-width variation technique. This prior art approach resulted in increased motor current harmonics and the occurrence of increased ripple in the input supply current at relatively low motor speeds. A new voltage control method is now proposed which minimizes the input supply and motor current ripples over the total speed (output frequency) range. This results in significant improvement in motor performance at low speeds and economic benefits by reducing the input filtering requirements and motor losses.

The Unrestricted Frequency Changer (UFC) described in U.S. Pat. Nos. 3,470,447 and 3,493,838 as static "artificially" commutated frequency converters with variable output voltage is well known in the literature, and this prior art type of converter will be hereinafter designated as the UFC.

When compared to other static power converters, the UFC has significant advantages that make it particularly suitable for providing variable frequency electric power to control the speed of AC motors. These advantages can be listed as follows:

1. Single stage power conversion with bidirectional power flow (i.e., power can flow either to or from the load). This permits regenerative braking of the motor.

2. A wide output frequency range, which is not limited by the input (supply) frequency. That is, the generated output frequency can be lower, higher, and equal to the input frequency.

3. The frequency spectrum of the output waveform is independent of the amplitude of the wanted fundamental component. Furthermore, the frequencies of the "unwanted" (harmonic) components in the output waveform are widely separated from the fundamental frequency over the total output frequency range. This separation of the harmonic frequencies from the fundamental increases "naturally" (i.e., without changing the method of output voltage waveform construction) as the fundamental output frequency decreases. Thus the frequencies of the harmonic currents in the motor remain high relative to the fundamental, even at low speeds. Therefore the motor runs without cogging.

4. The output voltages of a three-phase converter are inherently in balance. Nevertheless, individual control of the three output voltages is possible.

5. The lagging (inductive) motor displacement power factor results in leading (capacitive) displacement power factor (with equal phase angle) at the AC supply. Therefore, unity output (load) displacement power factor is reflected back to the AC supply without change.

6. Control is simple, that is, the output frequency and voltage can be controlled as shown in the Gyugyi et al patents by two appropriately displaced pulse trains, both having the same even rate.

However, the Unrestricted Frequency Changer has the disadvantage that with the prior art method of voltage control described in the above mentioned U.S. Patents, the amplitudes of the harmonic components in the output voltage, and those in the input current drawn from the AC power supply, increase appreciably as the fundamental output voltage is decreased. This results in increased losses in the machine at low speeds, and it may necessitate considerable filtering in the input supply lines. A method is now proposed, according to the present invention, by which the amplitude of the fundamental output voltage is controlled while maintaining an essentially constant amplitude ratio between the dominant harmonics and the fundamental voltage and current at the output and input terminals of the UFC as the output voltage is varied from maximum to zero.

The Unrestricted Frequency Changer (UFC) motor drive system described in the aforementioned U.S. Patents, is illustrated schematically in FIG. 1. It consists of three identical bidirectional converter power circuits, $CV_1$, $CV_2$, $CV_3$, supplying the three stator windings $W_1$, $W_2$, $W_3$, of an induction motor M, a gating logic GL generating the electrical signals necessary to turn ON and OFF the bilateral switching units ($A_1$, $A_2$, $B_1$, $B_2$, $C_1$, $C_2$) in each of the converters $CV_1$, $CV_2$, $CV_3$. A timing wave generator TWG is provided outputting two pulse trains $P_1$, $P_2$ in response to external analog signals which determine through a setpoint SP the output frequency $f_O$ and voltage $V_O$ applied to the motor. The relationship between the two control pulse trains $P_1$, $P_2$ and the output voltage $V_O$ of the UFC is illustrated by the waveforms (a), (b), (c) shown in FIG. 2. As seen by (a), pulse train $P_1$ determines the output frequency and in accordance with (b) pulse train $P_2$ determines the amplitude $V_O$ of the fundamental output voltage. The two pulse trains are so coordinated that the output voltage $V_O$ increases with increasing output frequency $f_O$ so as to maintain an essentially constant air-gap flux in the motor. FIG. 1 illustrates gating by the gating logic circuit GL of the gate drive circuit of switching unit $A_1$ within converter $CV_1$, switching unit $A_1$ having a GTO device mounted for bilateral operation. Switching unit $A_1$ is illustrative of the other switching units $A_2$, $B_1$, $B_2$, $C_1$ and $C_2$.

Figure 2:
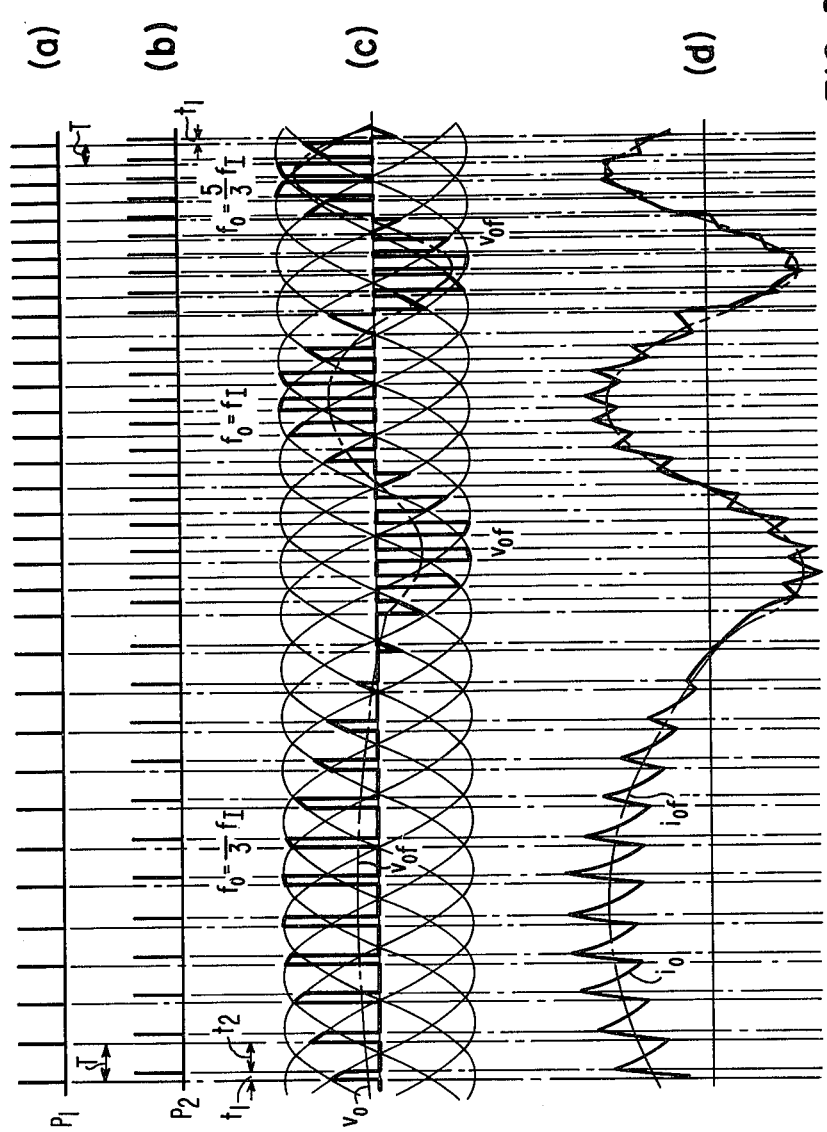
FIG. 2 is a chart illustrating with curves the effect of three different repetition rates and spacings of the control pulse trains P1, P2 of the system of FIG. 1 upon the output frequency and voltage and upon the output current.

It appears from curve (c) of FIG. 2, that between two consecutive pulses $P_1$, $P_2$ a segment of one of the input voltage waves provided by the input AC power source is connected to the output of the converter by the gated bilateral switches ($A_1$, $A_2$, $B_1$, $B_2$, ... or $C_2$). Between two consecutive pulses $P_2$ and $P_1$, the output of the converter is shorted by the bilateral switches. Such successive "segments of voltage" are derived from the input and applied to the output according to a definite conduction pattern which involves six consecutive different bilateral switches such as $A_1$ shown in the example of FIG. 1. Such successive "segments of voltage" are building up an alternating output voltage $V_O$ with an essentially sinusoidal envelope, as shown, for different output frequencies $f_O = \frac{1}{3}f_I$, $f_O = f_I$ and $f_O = 5/3f_I$, by curve (c) of FIG. 2. The average of the "voltage segments" caused by conduction of a bilateral switch ($A_1$, $A_2$, $B_1$ ... $C_2$) between two successive pulses $P_1$, $P_2$ (shown on FIG. 2 under (a) and (b), respectively) varies essentially sinusoidally over the output cycle as illustrated by the dotted line under (c) in FIG. 2. The motor current $i_O$ due to the converter output voltage $V_O$ as shown in FIG. 2 under (c) is illustrated in FIG. 2 by curve (d). The dotted line there shows the fundamental component $i_{Of}$ of the motor current $i_O$.

The switching pattern depends upon the time interval between two consecutive pulses $P_1$, $P_2$ as well as upon the repetition rate of the two trains of pulses. In order to maintain a constant air-gap flux in the motor, when the frequency $f_O$ increases (increased repetition rate of $P_1$, $P_2$) the voltage $V_O$ is automatically increased by spacing more $P_1$ and $P_2$ from one another, thereby increasing the width of each "voltage segment". This is shown in FIG. 2 under (a), (b) and (c) for three instances of output frequency: $f_O=\frac{1}{3}f_I$, $f_O=f_I$ and $f_O=5/3f_I$, where $f_I$ is the frequency of the input AC power source supplying the three converters $CV_1$, $CV_2$, $CV_3$.

Figure 3A:
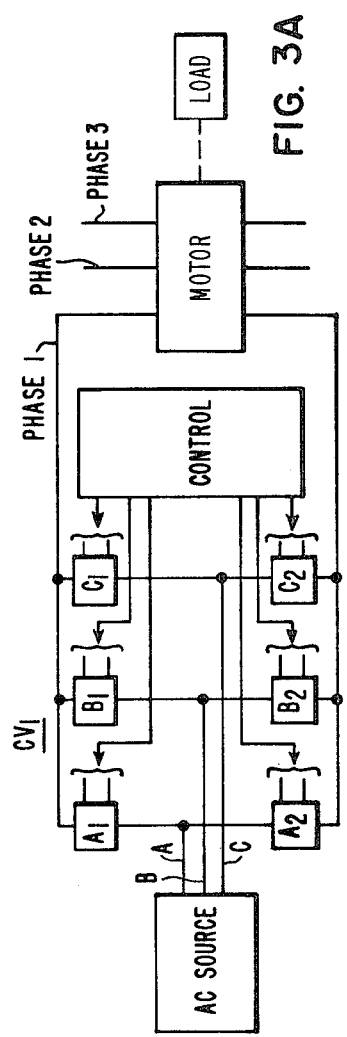
FIG. 3A shows the three phases of FIG. 1 associated with the load.

FIG. 3A shows the UFC connected with the three phases of the load.

Figure 3:
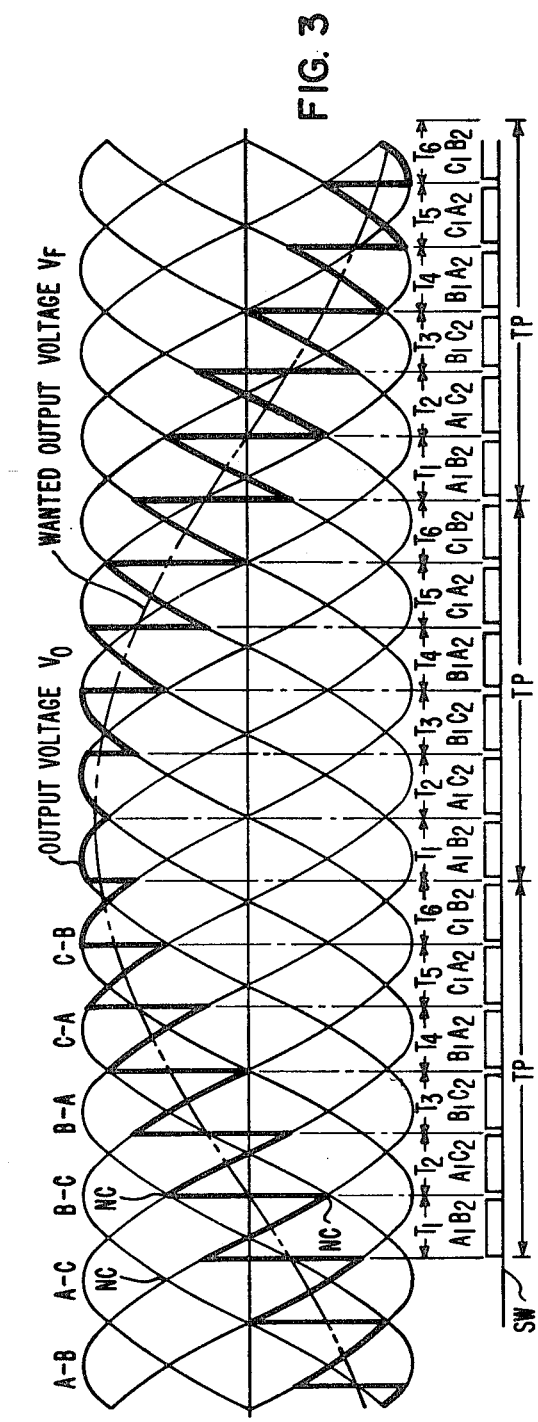
FIG. 3 shows with curves the operation of the system of FIG. 1 and FIG. 3A without exercising any control of the commutated switches of the converters for the purpose of adjusting the magnitude of the output voltage whereas, for comparison purpose.
Figure 4:
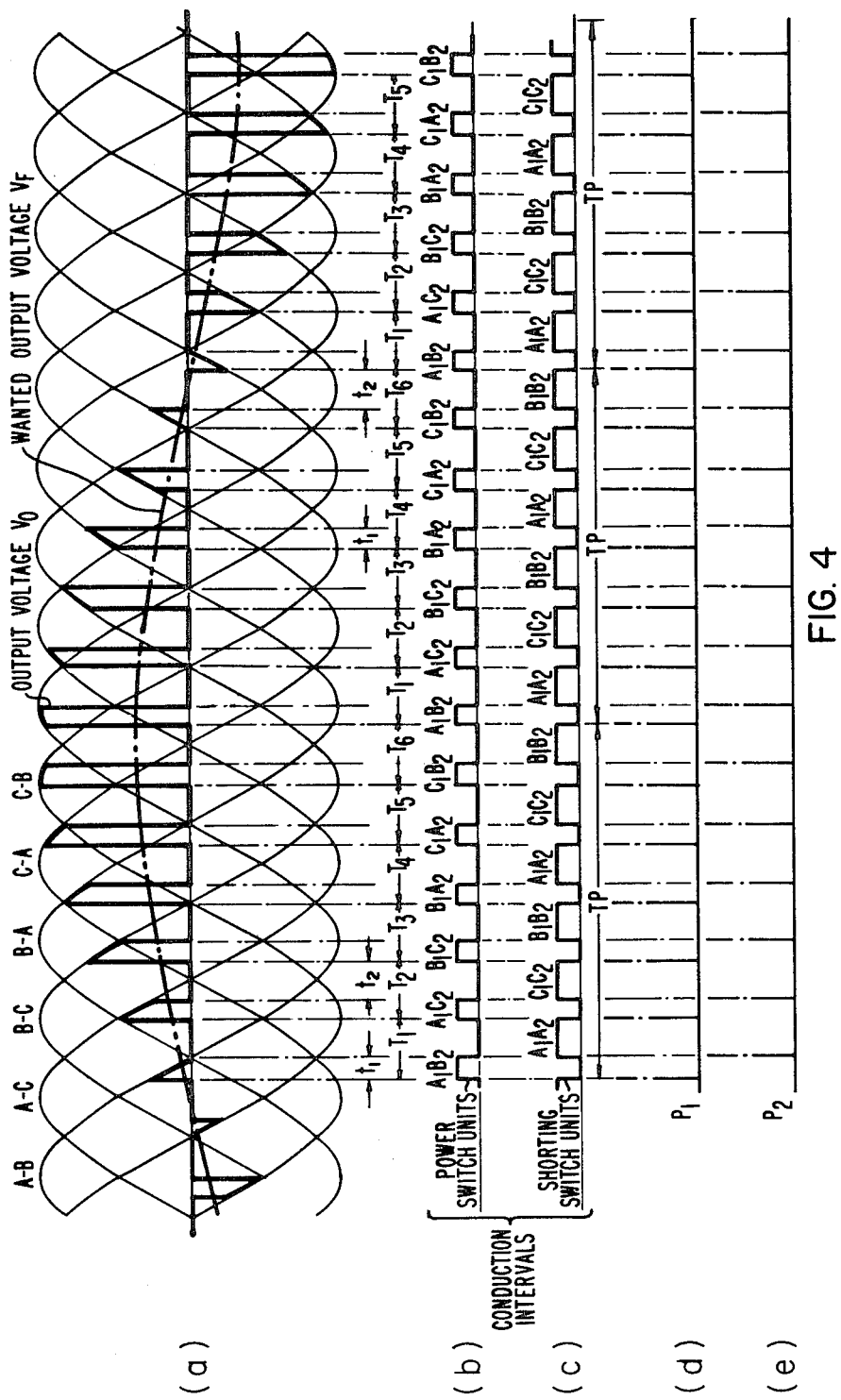
FIG. 4 shows with curves how the control pulse trains P1 and P2 of the system of FIG. 1 establish controlled periods of conduction delineated between controlled shorting periods to adjust the magnitude of the output voltage.

The basic operating principles of the UFC will be better understood by referring to the waveforms shown in FIGS. 3 and 4 for one of the three outputs of the UFC. The basic output voltage waveform $V_O$ of the UFC, ignoring for the moment the control of the magnitude of the fundamental component, can be generated by allowing the pairs of switching units $A_1B_2$, $A_1C_2$, $B_1C_2$, $B_1A_2$, $C_1A_2$, $C_1B_2$ to conduct, in that sequence, for a fixed period of time T, so that each of the input line voltages be connected in turn across the load during that pause period of time. The sequence is repeated at a predetermined repetition rate. As illustrated in FIG. 3, such repetitive switching pattern extends over a time period TP defined by the consecutive uniform time frames T, individually indicated at $T_1$, $T_2$, $T_3$, $T_4$, $T_5$, and $T_6$. This switching pattern provides an output voltage wave $V_O$ having a "wanted" fundamental component $V_F$ with a frequency $f_O$ equal to the difference between the AC supply frequency $f_{IN}$ and the repetition frequency $f_{SW}$ of the switching pattern, as explained in the above-mentioned patents.

While FIG. 3 illustrates the operation of a system in which for each bilateral switching unit the conduction interval (T) extends fully between two consecutive switching points NC, e.g. between two ON-coming static switches in the succession ($A_1B_2$, $A_1C_2$, $B_1C_2$, ... $C_1B_2$), FIG. 4 illustrates a system in which the duration of conduction (T) is controlled, e.g. reduced from such maximum duration T to $t_1$. As shown in FIG. 4 this is achieved by shorting the output terminals, that is, the load, during a complementary time interval $t_2=(T-t_1)$. This is achieved by the pair of switches connected to the same input line ($A_1A_2$, $C_1C_2$, ... $B_1B_2$). Such width-control of $t_1$ within T allows the control of the fundamental output voltage, as explained in either of the two aforementioned patents. This mode of control is characterized by a repetitive switching pattern extending over the time period TP that is defined by six uniformly spaced time frames T labeled $T_1$ through $T_6$. In time frame $T_1$, power switches $A_1$ and $B_2$ are turned on for the time interval $t_1$. At the end of the interval $t_1$, switches $A_1$ and $A_2$ are turned on for the duration of interval $t_2$ to short the load and thereby provide a path for the load current. In the next time frame $T_2$, switches $A_1$ and $C_2$ are turned on for the duration of interval $t_1$ to apply an increment of input voltage $V_{AC}$ to the load. At the end of interval $t_1$ of time frame $T_2$, switches $A_1$ and $C_2$ are turned off and switches $C_1$ and $C_2$ are turned on for the duration of interval $t_2$ of the same time frame to short the load. The rest of the sequence in the switching pattern should be apparent from examination of FIG. 4. It is also obvious from the figure that pulse train $P_1$ defines the time frame T, and thereby the output frequency of the fundamental or wanted output voltage $V_F$ of output voltage wave $V_O$, whereas pulse train $P_2$ defines the relative length of intervals $t_1$ and $t_2$, in the given time frame T, and thus determines the amplitude of the fundamental component $V_F$.

Figure 5:
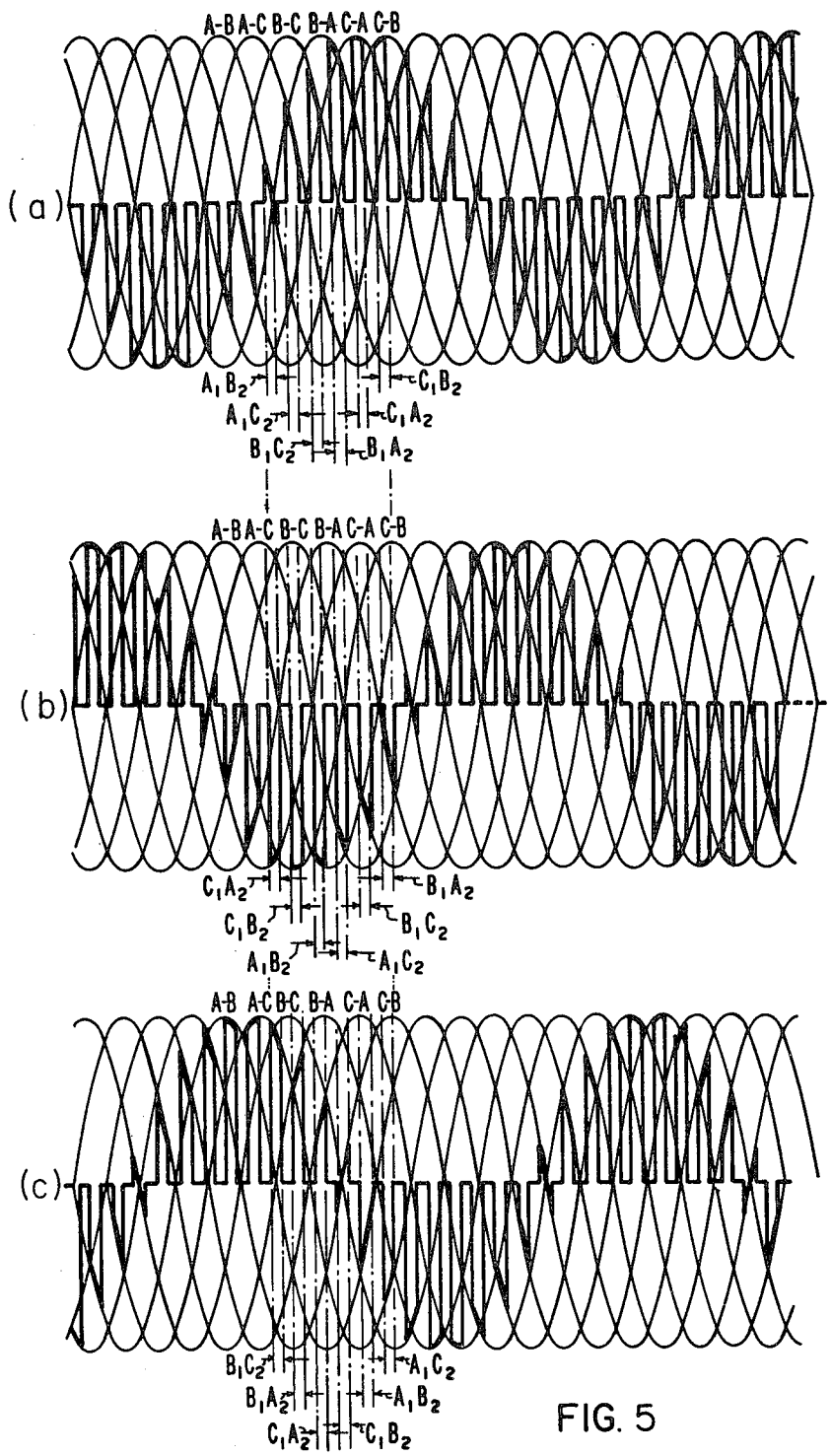
FIG. 5 is a chart with curves comparing the three phases of the UFC system of FIG. 1.

The switching pattern for the three phases of a complete three-phase UFC is shown in FIG. 5.

One disadvantage with the prior art UFC system just described is that the amplitudes of the unwanted (harmonic) components increase in the output voltage as the output frequency is decreased. This is because the time interval $t_1$ during which the input voltage is applied to the motor load, is reduced relative to the uniform time frame T, when the output frequency is decreased, thereby to maintain the output voltage to frequency ratio constant for the AC motor. The decreasing time interval $t_1$ and the increasing time frame T, result in increased harmonic currents in the motor at low output frequencies, as illustrated by the motor current waveforms $i_O$ (d) in FIG. 2. Therefore, the motor losses increase with decreasing motor speed.

Another disadvantage is that the amplitudes of the harmonics in the input currents, drawn at the input of the UFC from the three-phase AC power source, also increase as the fundamental component of the output voltage is being decreased by means of decreasing the time interval $t_1$. This appears on FIG. 6 from the segments $i_A$, which average to $i_{AF}$, aligned with the segments of the output voltage wave $V_O$ having a fundamental component $V_{OF}$ (see curves (a) and (b) of FIG. 6). As a consequence, the filtering requirements at the input terminals of the UFC converter increase considerably as the output frequency (and thus the output voltage) is decreased.

The object of the present invention is to minimize and even eliminate these disadvantages. To this effect a voltage control method is proposed such that the amplitudes of the significant harmonics in the output voltage and input current waves remain essentially proportional to the amplitude of the fundamental component as the amplitude of the fundamental component is decreased at reduced output frequencies.

Figure 7:
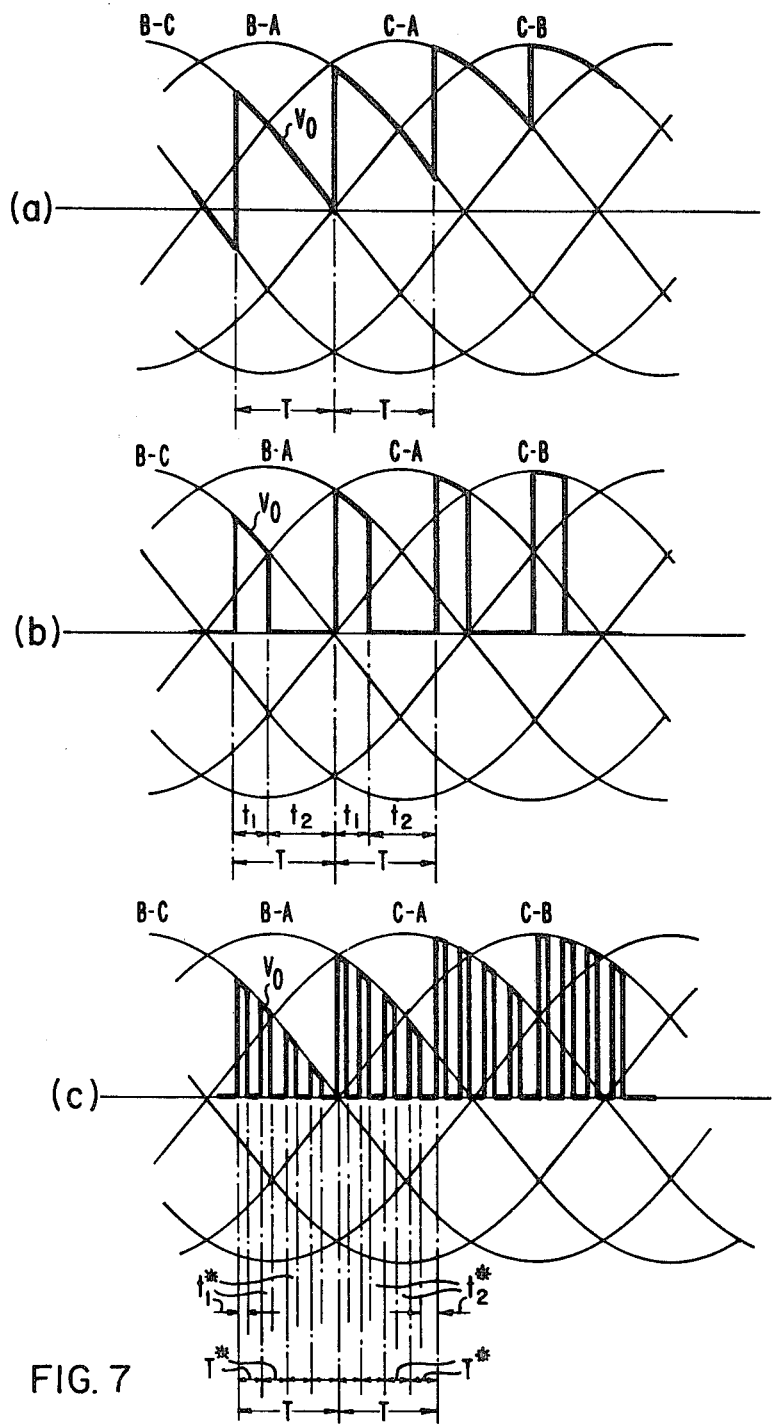
FIG. 7 is a chart of curves comparing the no-control situation of FIG. 3, the control situation of FIG. 4 and the mode of controlling the switches of the converters of FIG. 1 in accordance with the present invention.

The gist of the UFC output voltage control method according to the invention will be understood from a comparison of curves (a), (b) and (c) in FIG. 7.

Curves (a) illustrate the previously described method of connecting the AC input supply voltages in sequence for uniform time durations T to the output (load) to generate the basic UFC output voltage waveform, without any means of controlling the amplitude of the fundamental component of the output voltage.

Curves (b) illustrate the method of voltage control described in the aforementioned U.S. patents. As explained previously, the uniform time durations T are subdivided into two intervals $t_1$ and $t_2$. During interval $t_1$, the input supply voltages are, as before, connected to the output by the switches of the power converter. During time interval $t_2$, the input supply voltages are disconnected and the load is shorted by the switches of the power converter. The relative lengths of intervals $t_1$ and $t_2$ within the basic time duration (or time frame) T determine the amplitude of the fundamental output voltage generated by the UFC.

Curves (c) illustrate the basic technique used in the proposed method of voltage control. As shown, the uniform time durations T are subdivided into n (n equals four in the figure) subdurations $T^*$, that is, $nT^*=T$. Each subduration $T^*$ is divided into two intervals $t_1^*$ and $t_2^*$, which are adding up so that $t_1^*+t_2^*=T^*$, and so that $nt_1^*=t_1$ and $nt_2^*=t_2$. During time intervals $t_1^*$, within each time frame T, the same input supply voltage, which is due in the normal UFC sequence, is connected repeatedly n times to the output, whereas during such time intervals t₂*, the input voltage is disconnected from the output and the load is, as before, shorted. Since nt₁*=t₁ and nt₂*=t₂, it is evident that the fundamental component of the output voltage wave will be the same as obtained with the prior art control method. However since time intervals t₁* and t₂* are generally shorter than the corresponding time intervals t₁ and t₂ in the prior art, it can be shown that the amplitudes of the most significant harmonic components in the output voltage and input (supply) current waves not only do not increase as they do with the prior art control but actually decrease when the amplitude of the fundamental output voltage component is reduced from its maximum value.

It should be understood that the subdivision within a given time frame T, and the repetition of the subdivisions in consecutive time frames, need not be uniform. In other words, subintervals T*, t₁*, and t₂* need not form a uniform pattern in a given time frame, and different patterns may be established in consecutive time frames. For non-uniform subdivision of time frame T, the relationship between intervals T* and T, t₁* and t₁, t₂* and t₂ previously given (nT*=T, nt₁*=t₁, nt₂*=t₂) can be generalized as follows:

$$\sum_{k=1}^{n} T_k^* = T, \quad \sum_{k=1}^{n} t_{1k}^* = t1 \text{ and } \sum_{k=1}^{n} t_{2k}^* = t2,$$

where integer n may vary from time frame to time frame.

Figure 8:
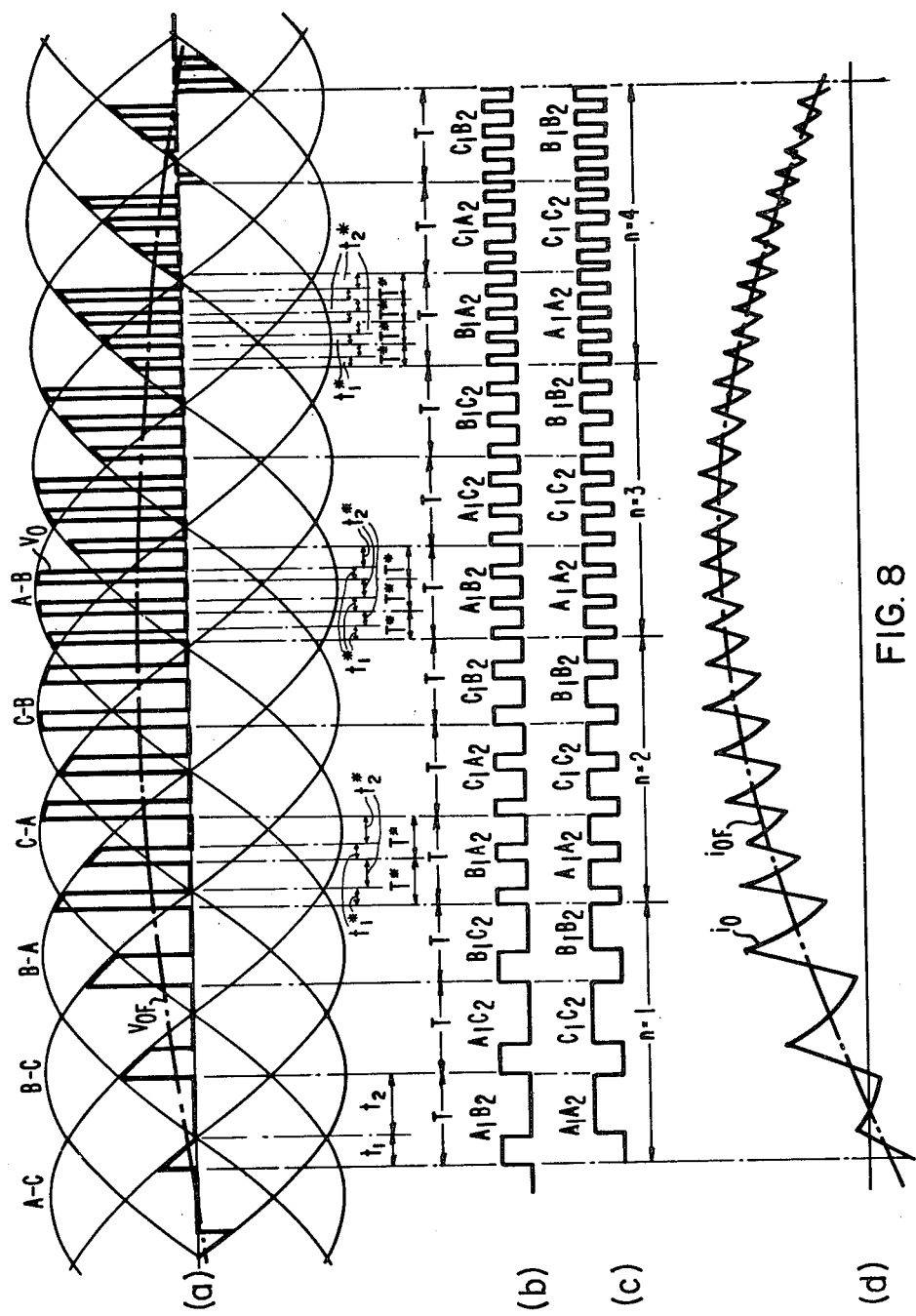
FIG. 8 illustrates for $n=1$; $n=2$; $n=3$ and $n=4$ the controlling mode according to the invention, where n indicates the order of subdividing and fractionalizing the period of conduction; the curves show the effect on the quality of the output current.

The benefit in the reduction of the motor current "ripple" appears from curves (d) in FIG. 8. As the number n of subdurations T* is increased from one (prior art) to two, three, and four within the basic time frame T at a given output frequency $f_O(f_O=1/(6T)-f_I)$ the ripple on the current $i_O$ is much reduced.

With n=1, e.g. as in the aforementioned U.S. patents, the full time frame T is divided into a reduced conduction period t₁ and a complementary shorting period t₂. Static switches A₁B₂ in the bridge converter system of FIGS. 1 and 4 are conducting during t₁, connecting source voltage $V_{A-B}$ to the load, static switches A₁A₂ together perform a short during t₂ which isolates the load from the source and causes a notch in the output wave as shown in curves (a) for $V_O$. The conducting pattern indicates conduction of A₁ and C₂ in the next time frame T for duration t₁, which is followed by shorting between C₁ and C₂ during another time interval t₂, and so on. The controlling periods are shown by curves (b) for t₁ and (c) for t₂. The magnitude of the current $i_O$ is shown by curves (d) with excessive peaks and lows due to the sharp correlating voltages in the $V_O$ curves under (a). That is, the current $i_O$ increases during intervals t₁ when voltage is applied to the load (motor) and decays during intervals t₂, when the load is shorted, due to losses.

FIG. 8 shows what happens when according to the present invention, the time frame T is divided into two equal subperiods T*=½T. In each such subperiod T* the same procedure as under the aforementioned patents is performed: (1) a time period t₁* which half of t₁ causes a narrower slice of the $V_{AB}$ voltage wave (curves (a)), and (2) a relaxation period t₂* which is the half of t₂ follows. The same procedure is repeated twice (n=2) within the original time interval of duration T. FIG. 8 also shows the situation where n=3. The slices are still smaller and spread with relaxation periods in between each reserved to shorting of the load. FIG. 8 shows further the n=4 situation. The improvement in $i_O$ (curves (d)) is more marked with the last increased division of the time interval T.

Figure 6:
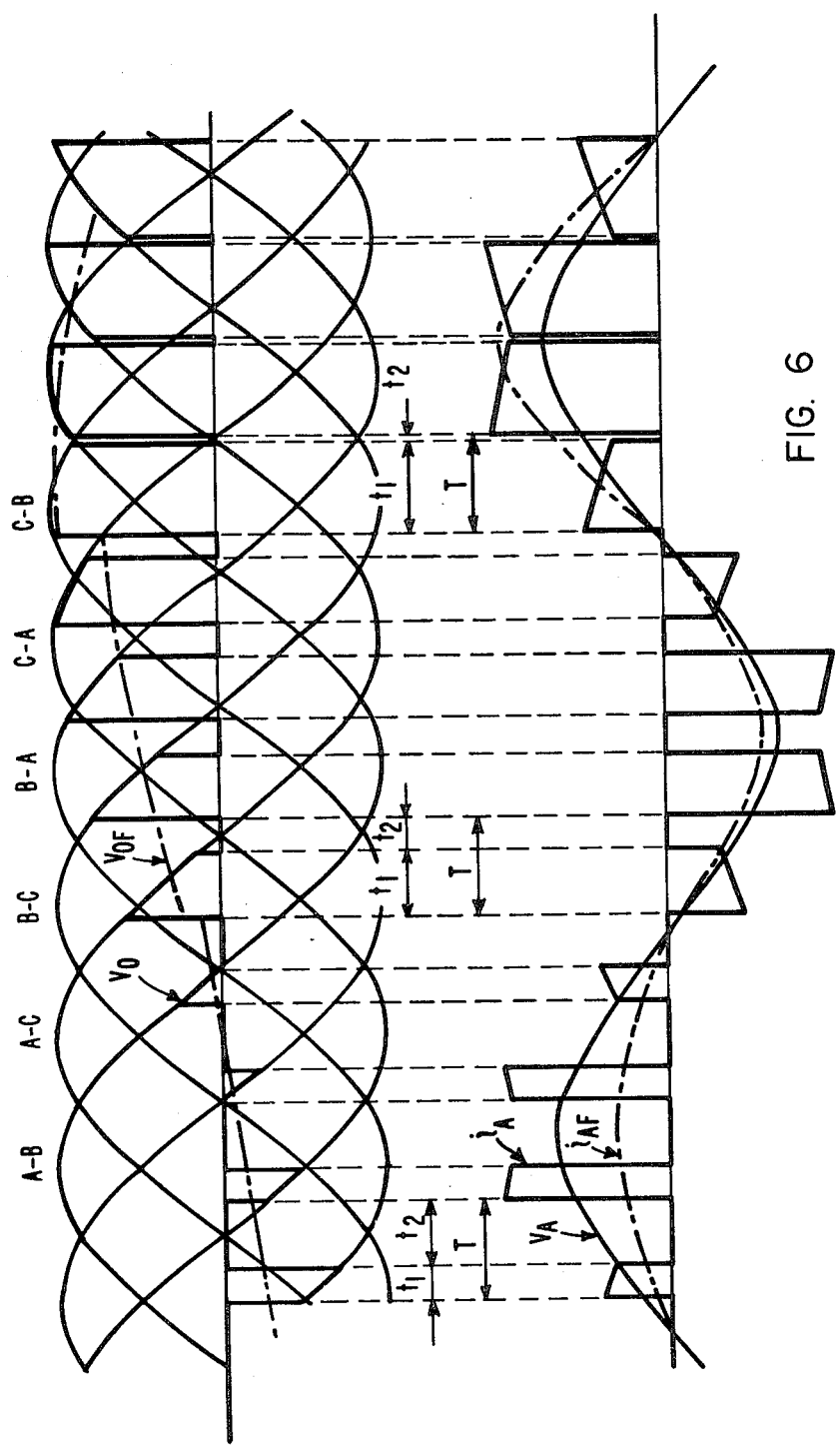
In FIG. 6 are juxtaposed voltage and current curves illustrating conduction periods of increased duration and their effect on the harmonics of the input currents drawn from the AC power source.
Figure 9:
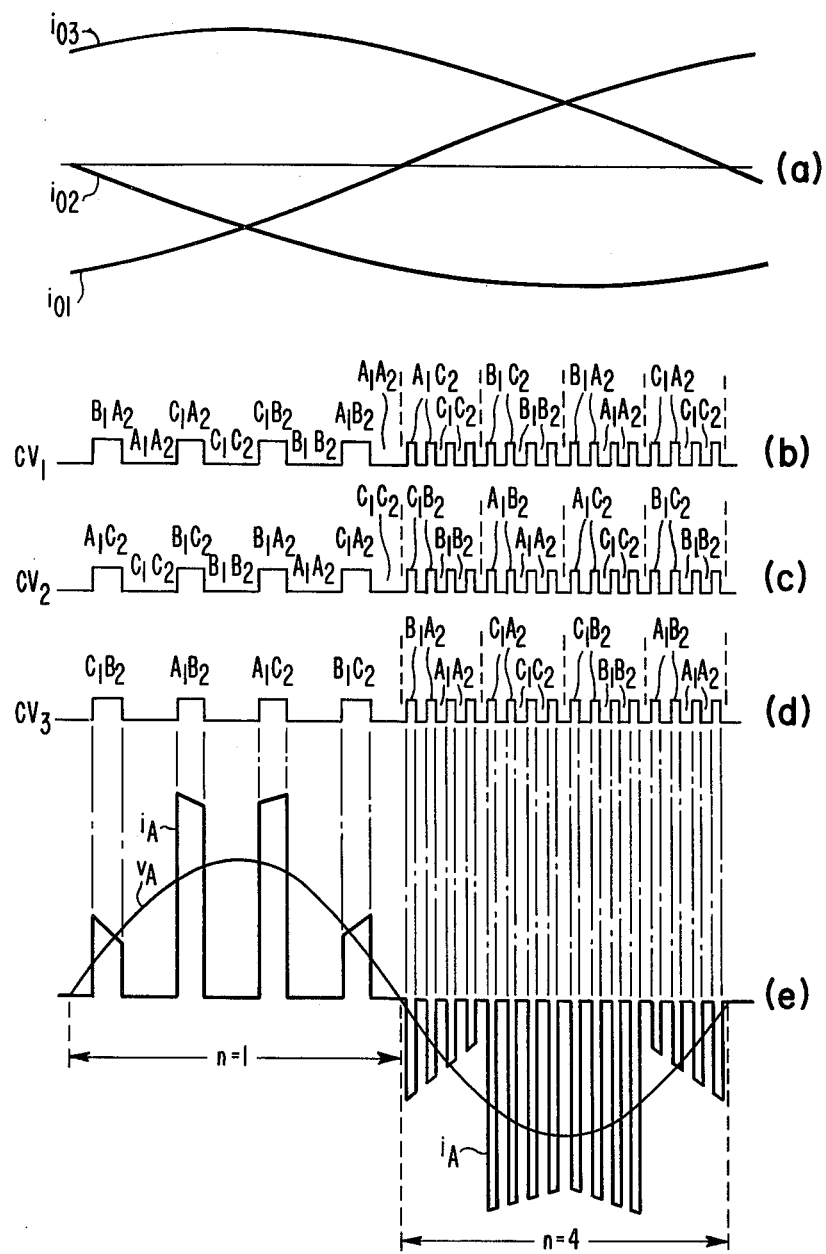
FIG. 9 shows for $n=1$ and $n=4$ the effect of subdividing and fractionalizing the period of conduction on the importance of the input current harmonics.

FIG. 9 shows under (e), as compared to FIG. 6 for the case where the output frequency $f_O=\frac{1}{3}f_I$ (where $f_I$ is the frequency of the input wave), how the high peaks and lows of the input current $i_A$ for phase A (voltage $V_A$) are spread throughout the time frame T when dividing by 4 (n=4) each area.

Indeed, the areas, which under the new approach are divided from the original voltage segment under the prior art technique, are adding up to the same total area as started from, thereby not to change the average value of the output voltage.

The changes in the input current waveform $i_A$ when increasing n from one to four are illustrated by curve (e) of FIG. 9. It shows that the "envelope" of the input current wave at n=4 is similar to the one obtained at full output voltage and that the voltage control introduces only relatively high frequency components which can be shunted by relatively small filters at the input terminals of the UFC.

The UFC power converter of FIG. 1 has been illustrated with three-phase AC power source ($V_A$, $V_B$, $V_C$) and a three-phase load (W₁, W₂, W₃). The three converters CV₁, CV₂ and CV₃ associated with respective windings W₁, W₂, W₃, of the indution motor M, have been shown of the bridge-type. Thus, in relation to each phase (W₁, W₂, W₃) there are provided pairs of static switches (A₁, A₂), (B₁, B₂) and (C₁, C₂), each pair having a common portion connected to the input phase (A, B, C, respectively). It is observed that with the bridge type circuit shown in FIG. 1, implementation of the shorting path requires no additional switching devices, since the short circuit which is applied during the period t₂ can be applied through the two series connected bilateral switches in any "leg" of the bridge. This is illustrated in FIGS. 4 and 8. With such an arrangement it is clear that the sequence of conduction between the six switches is (A₁B₂); (A₁C₂); (B₁C₂); (B₁A₂); (C₁A₂) and (C₁B₂). Instead of switching from C₁ to A₁, from B₂ to C₂, from A₁ to B₁, from C₂ to A₂, from B₁ to C₁ and from A₂ to B₂, at the points NC defined by time frame T, between successive input voltage phases $V_{AB}$, $V_{AC}$, etc., the shorting period t₂ is interposed at the expiration of time t₁ in the prior art, (of time t₁*=t₁/n in the proposed improved UFC system), by making the switch pairs (A₁A₂); (C₁,C₂); . . . (B₁,B₂) conductive throughout the time period TP. This is done once with the prior art approach. In contrast, this is repeated n times with the UFC control mode according to the invention, so as to establish so many shorting periods between the divided conduction periods t₁/n, as shown typically in FIG. 8 for n=2, n=3 and n=4.

It is understood that the bridge-type converter is described here only for the purpose of illustration. Is is explained at length in the aforementioned book of L. Gyugyi and B. R. Pelly that the UFC may have static switch arrangements between the input phases other than the bridge-type. See for instance the arrangements of FIG. 1.25, page 41 for a three-pulse frequency changer; of FIG. 1.26, pages 42–44 for a six-pulse frequency changer; of FIG. 1.27, page 45 for a nine-pulse frequency changes and of FIG. 1.28, page 46 for a twelve-pulse frequency changer, in Gyugyi's book. For the purpose of this description, those pages are hereby incorporated by reference.

As illustrated in FIG. 2, when applying the UFC technique to effectuate AC motor speed control, the relative length of conduction time interval $t_1$ decreases and that of shorting time interval $t_2$ increases, within the time frame T, which also increases, as the output frequency of the UFC is decreased, in order to keep the output frequency to voltage ratio, and thereby the air-gap flux in the motor, approximately constant. As already explained, the increasing time duration T, and the decreasing time interval ratio $t_1/t_2$ result in significantly increased ripple both in the motor and input supply currents of the prior art UFC at relatively low output frequencies. On the other hand, at relatively high output frequencies the fundamental output voltage is close to its maximum value. Then, time interval $t_1$ has become longer than $t_2$, and the prior art voltage control has no longer any significant effect on the ripple of the output and input currents.

In contrast, with the proposed voltage control method, in which the basic time frame T is subdivided into n subframes of duration $T^*$ (each with a $t_1^*$ and a $t_2^*$ interval during which the load is either connected to the AC input supply or shorted) the switching rate of the power devices in the UFC is increased n times. In a practical UFC motor drive system, the output frequency may be controlled typically in the range of zero to 2 times the input frequency (for a 60 hertz input power source, the range is between zero and 120 hertz). This would require to vary the basic time frame T from $T=1/6(f_I)$ (zero output frequency) to $T=1/(18f_I)$. In other words, the length of T at the maximum output frequency ($f_{Omax}=2f_I$) is one-third of that at the minimum output frequency ($f_{Omin}=0$). This means that the switching rate of the power devices increases by a factor of three at the maximum output frequency.

Since the prior art voltage control has an adverse effect on the output and input current ripples primarily at relatively low output frequencies, and the switching rate of the power devices in a UFC cannot be made arbitrarily high for practical reasons (for example, this introduces switching losses), it has been concluded that a voltage control method in which the number, n, of subtime frames $T^*$ is varied with the length of the time frame T, provides the best practical solution. With this arrangement, both the output/input current ripple and the switching rate of the power devices in the UFC can be kept within reasonable limits over the total output frequency range.

To summarize, with the proposed method of UFC output voltage control, the basic frame T, during which the input supply voltages are in sequence connected to the output, are subdivided into n (n is an integer number greater than one) subframes of duration $T^*$ ($T=nT^*$). Each subframe is further divided into two time intervals $t_1^*$ and $t_2^*$. During time intervals $t_1^*$, within a time frame T, the load is connected to one of the input voltages by the UFC power switches. During time interval $t_2^*$, the output is disconnected from the input supply and the load is shorted by the UFC power switches. The amplitude of the fundamental output voltage is approximately proportional to the ration $t_1^*/T^*$. The number of subtime frames (determined by integer n) is varied as a function of time frame T (n is decreased with decreasing T) in such a way that the ratio $t_1^*/T^*$, which determines the amplitude of the fundamental output voltage, remains the same at a given T independently of n. Here again, in the case of unequal $t_1^*$ and $t_2^*$ subintervals the amplitude of the fundamental output voltage is determined by the ratio $$\sum_{k=1}^{n} t_{1k}^*/T.$$

Referring to curves (a) of FIG. 7, it may be noted that to connect any pair of lines in FIG. 1 to the load requires a switching unit having at least two bilateral switches BS. It is thus seen that the respective switching units $A_1B_2$, $B_1A_2$, $A_1C_2$, $C_1A_2$, $B_1C_2$ and $C_1B_2$, when individually operated, can effect six different circuit configurations involving the input lines and the load, each of the circuit configurations involving a pair of the input lines and the load in a particular one of the two possible reversely related modes of connection. Thus each of the switching units when turned ON provides a different one of six different circuit configurations between said input lines and the output circuit, each of said circuit configurations interconnecting the load and a pair of the input lines. For purposes of discussion, the individual bilateral switches BS are assumed to be perfect, that is they can be closed and opened at any given time instant, and when closed, the current is free to flow in either direction at all times.

Let it first be assumed that control circuit CT of FIG. 3A is so arranged that switching units $A_1B_2$, $A_1C_2$, $B_1C_2$, $B_1A_2$, $C_1A_2$, $C_1B_2$, are allowed to conduct in that sequence for a fixed period of time T, so that each of the input line voltages is in turn connected across the load for the same interval of time, the sequence being repeated at a predetermined repetition rate R. As is illustrated in FIG. 4, this cyclic or repetitive switching pattern extends over a time period TP defined by six consecutive uniform time frames T, individually indicated at $T_1$, $T_2$, $T_3$, $T_4$, $T_5$ and $T_6$. Each switching unit is ON for a full time frame T as indicated by the switching curve SW in FIG. 4. This pattern of switching provides an output voltage wave $V_O$ having a "wanted" fundamental $V_F$ with a frequency $f_O$ equal to the difference between the frequency $f_I$ of the input alternating current and the repetition frequency fsw of the switching pattern. The system and above type of control which produces this output voltage waveshape is potentially well suited to the speed control of an AC machine for the following reasons: A wide output frequency range is possible; frequencies on either side of line frequency can be obtained; the transition through line frequency is without incident; the frequency of the lowest harmonic component is widely separated from the "fundamental" frequency and there are no DC or subharmonic components.

While this type of control has its advantages it is considerably restricted in its field of application because, although frequency control is possible, control of the output voltage cannot be achieved, except by controlling the input voltage. Thus this type of control cannot be economically applied to the speed control of an AC machine.

The conduction angle or dwell time of each switching unit is for the full extent (assuming perfect switches) of its associated time frame T. For example it is readily seen in FIG. 3, that for the time frame $T_1$, switching unit $A_1B_2$ applies the input voltage A-B to the load for the full duration of the frame. In the next frame ($T_2$), switching unit $A_1C_2$ is turned on to apply voltage A-C to the load for the full duration of the frame $T_2$, and so on.

Referring to curves (b) of FIG. 7 it is now observed that the magnitude of the average output voltage is simply and accurately controlled by controlling the conduction angle (length of conduction dwell time) within and relative to the length of its associated time frame T, for example as illustrated by the curves in FIG. 4. In this figure as in FIG. 3, the six uniformly time spaced AC voltages, which characterize the three phase input power, are indicated in their phase rotation or order at A-B, A-C, B-C, B-A, C-A, and C-B. Each of the time frames T in FIG. 5 is subdivided into two portions $t_1$ and $t_2$ of controllable length relative to the length of the frame. During the period $t_1$ of any frame, the appropriate input line voltage is connected across the load by the turned ON switching units associated with that time frame. However during the period $t_2$ of the frame, the input line voltage is disconnected and the load is shorted by two switching units in one of the three "legs" of the converter, thereby providing a circulating path for the current of an inductive load. Thus $t_1$ is the conduction angle or dwell time of an input voltage application, while the interval $t_2$ is the shorting interval. By controlling the ratio of the periods $t_1:t_2$, and at the same time maintaining their sum constant ($t_1+t_2$ is equal to T), the fundamental component of the output voltage can at any given frequency be continuously controlled from maximum to zero.

Figure 10:
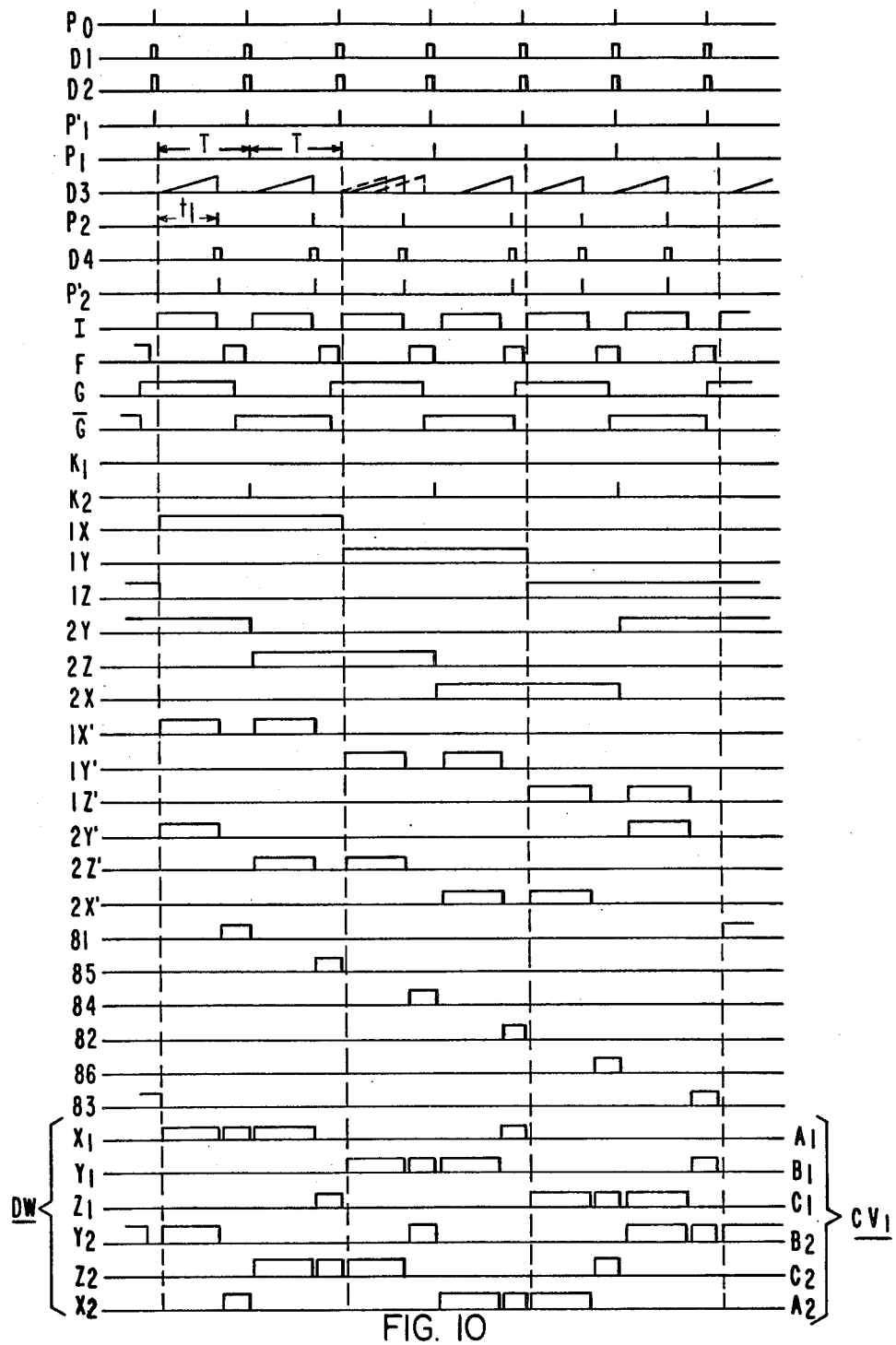
FIG. 10 is a chart of curves showing the generation of signals P1, P2 of FIG. 1 and the derivation of driver signals for the converters in the system of FIG. 1.

Still referring to curves (b) of FIG. 7, the switches in each of converters $CV_1$, $CV_2$, $CV_3$ are driven under the prior art control mode in accordance with six drive waveforms DW shown at the bottom of FIG. 10 and referenced at their left ends as $X_1$, $Y_1$, $Z_1$, $Y_2$, $Z_2$ and $X_2$, except that the sets of drive waveforms for each of the converters is displaced 120° from the drive waveforms for the next converter. For example, if these drive waveforms are arbitrarily assigned to the switches of converter $CV_1$ the distribution indicated at the right end of the waveforms, then the drive waveforms for converter $CV_2$ will be the same except displaced by 120° from the $CV_1$ set of drive forms, and the drive waveforms for converter $CV_3$ will be the same except displaced 120° from the drive waveforms of converter $CV_2$. A common control circuit produces the set DW of drive waveforms and distributes them between the three converters $CV_1$, $CV_2$, and $CV_3$.

The repetitive rate of pulses $P_1$, $P_2$ of FIGS. 1, 2 and 4 is provided by a timing waveform generator having a clock the output frequency of which is adjustable in response to adjustment of the magnitude of a reference voltage applied through setpoint SP of FIG. 1. Thus, all the curves of FIG. 10 are along the same relative time base. The output of the generator consists of a train of short duration pulses $P_O$, uniformly spaced and occurring at regular time intervals. Pulses $P_O$ are fed to a circuit introducing a fixed time delay $D_1$. This results in output pulses $P'_1$. Pulses $P'_1$ are fed to another time delay $D_2$, thereby to generate output pulses $P_1$, further delayed with respect to pulses $P_O$.

Pulses $P_1$ are fed to a variable delay circuit providing output pulses $P_2$, delayed by a time $t_1$ with respect to pulses $P_1$. This time delay is shown as an adjustably timed ramp function $D_3$, the output trailing edge of which is differentiated to produce the pulses $P_2$. The adjustability of the timing waveform is symbolized by two random adjustments shown in dotted form on $D_3$. Pulse I of FIG. 10 is defined by a flip flop in response to the delayed pulse $P_2$ or, in the event of the time delay setting of delay $D_3$ be greater than the interval between pulses $P_1$ and the reset pulses $P_O$, by the latter pulse $P_O$. Thus pulses $P_O$ serve as "end stop" pulses and mark the limits of periods $t_1$. Since the delay between pulses $P_O$ and $P_1$ is relatively short, the maximum possible time, $t_1$ becomes then, nearly equal to the time T. Under such condition the maximum possible practical output voltage is obtained from the UFC as in the case of FIG. 3 and FIG. 7, curves (a). Pulse I is reset to zero by pulses $P_1$ (its values are I and $\bar{I}$).

Pulses, $P_1$ are used to initiate conduction of the power transfer switching units ($A_1$, $A_2$, . . . $C_1$, $C_2$). Pulses $P_2$ are at the same rate, but adjustably displaced by a chosen time interval $t_1$. These pulses are employed to terminate the conduction dwell time of the switching unit. Thus, pulse train $P_1$ will determine the output frequency and pulse train $P_2$ will determine the output voltage. By varying the positions of pulses $P_2$ relative to pulses $P_1$, the ratio of conduction intervals or dwell times $t_1$ to conduction dwell times $t_2$ is varied, thereby varying the magnitude of the average output voltage, as explained in the aforementioned U.S. patents.

Pulses $P_2$ are also transmitted through a delay $D_4$ to provide pulse train $P'_2$. Pulse train $P'_2$ is delayed with respect to pulse train $P_2$ by a short time necessary to turn OFF the power transfer switching units. Pulses $P'_2$ are used to initiate the conduction of switching units, the purpose of which is to create a "shorting" path interrupting the passing of energy to the load. A pulse train $P'_1$ out of the output of delay $D_1$ slightly precedes pulses $P_1$ thereby to give time to initiate the subsequent power transfer switching units. Thus pulses $P'_1$ are employed to terminate the previous "shorting" conduction interval as shown by signal F.

Thus, a single pulse train with an even rate of pulses per second is employed to initiate the interval $t_1$, and a second pulse train, with the same even rates, but with an appropriate displacement relative to the first train is employed to end the time period $t_1$ and to initiate the time interval $t_2$.

The I signal represents the conduction period for outputting a "slice" of AC voltage from the input power source. The F signal is used for "shorting". Distribution and application of the "slice" and "shorting" control signals is effected with the assist of a ringcounter function. To this effect in a conventional manner the clock pulses $P_O$ are used to trigger a common-trigger type flip-flop producing two rectangular pulse trains, $\overline{G}$ and $\overline{G}$. Pulses G always overlap even $P_1$ pulses, whereas the $\overline{G}$ pulses overlap the odd $P_1$ pulses. Pulses $K_1$ and $K_2$ are obtained by feeding pulses G and $P_1$ and $\overline{G}$ and $P_1$ respectively, to two AND gates. Pulses $K_1$ and $K_2$ are fed to the inputs of two three-stage ring counters, respectively. The outputs of one ring counter are 1X, 1Y and 1Z. The outputs of the other ring counter are shown as 2X, 2Y and 2Z. The respective outputs of waveforms 1X', 1Y', 1Z', 2Z', 2Y' and 2X' are obtained. These are the basic drive waveforms for rendering conductive the power transfer switching units during the "slice" time intervals $t_1$. As previously described, pulses F define the intervals $t_2$ during which the "shorting" switching units conduct. These pulses are distributed into six separate pulse trains 81–86 in a cyclic manner. Waveforms DW represent the driver signals as applied from 1X', 1Y', 1Z', 2X', 2Y', 2Z' and 81–83 once combined after distribution onto the individual bilateral static switches, in the instance of one output phase, namely converter $CV_1$. The relationship between the driver signals and the switching units is as follows: $X_1$ for $A_1$; $Y_1$ for $B_1$; $Z_1$ for $C_1$; $Y_2$ for $B_2$; $t_2$ for $C_2$ and $X_2$ for $A_2$.

Control implementation according to the present invention will now be described in the context of the aforementioned U.S. patent as applied to a variable speed AC motor drive system. For the purpose of fully describing operation and control of the UFC induction motor drive system of the prior art over which the present invention is an improvement, the aforementioned U.S. Pat. Nos. 3,479,447 and 3,493,838 hereby incorporated by reference.

Figure 15:
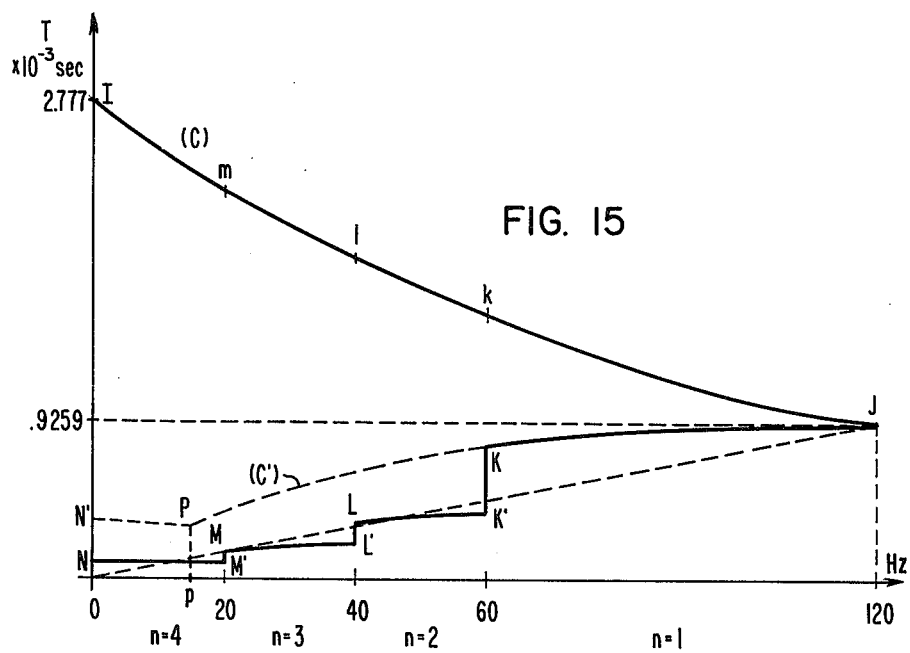
FIG. 15 shows with curves how look-up tables are made for table $TB_1$ of FIG. 12.

An Unrestricted Frequency Changer employing the proposed method of controlling the output voltage by subdividing the $t_1$ and $t_2$ conduction periods of the switches within each time frame T, as shown by curves (c) of FIG. 7, can be implemented by utilizing the three-phase bridge-type converters, the bilateral static switches and the isolated distribution circuits of the prior art UFC apparatus shown in FIGS. 7, 15 and 17, respectively of the incorporated by reference U.S. patents. The basic functional requirements of the control circuits of the proposed UFC apparatus and for the prior art UFC apparatus are identical regarding the control of the output frequency as defined by an external voltage reference, the control of the output voltage as a function of the output frequency (a requirement of the AC motor drive application), the control of the total conduction period $t_1$ of each basic time frame T, to produce the required amplitude of the fundamental component of the output voltage waveforms, and the generation of the repetitive UFC switching pattern sequences defined in FIG. 4 herein. The additional control function required for the proposed UFC is to effectuate the subdivision of the $t_1$ and $t_2$ conduction periods into n number of $t_1^*$ and $t_2^*$ subperiods in each time frame T. The integer n is varied with the output frequency $f_O$ as previously stated.

Figure 11:
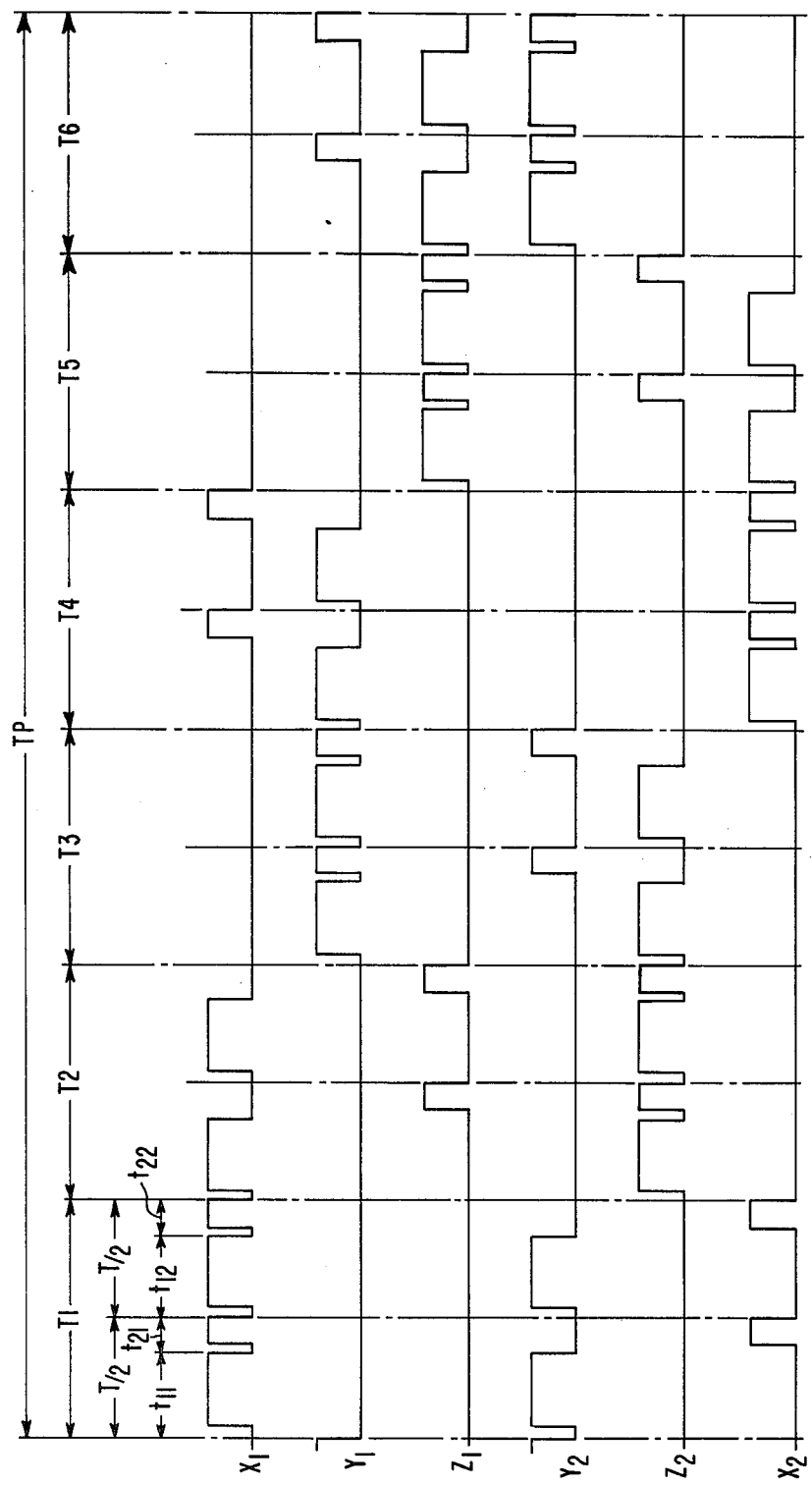
FIG. 11 illustrates for $n=2$ the timing and distribution of the driver signals of FIG. 10 to effect a subdivision and fractionalizing of the period of conduction in accordance with the invention.

The switching waveforms required for the proposed method of output voltage control are shown in FIG. 11 for n=2 i.e., with the conduction periods $t_1$ and $t_2$ subdivided into two equal periods $t_{11}$, $t_{12}$ and $t_{21}$, $t_{22}$, respectively. These waveforms are modified from those labelled DW in FIG. 10 and identified as Z1, Y1, X1, X2, Y2, Z2. Thus, as shown by curves (c) of FIG. 7, with n=4 the time interval $t_1 = (T - t_2)$ is divided by 4, and the time frame T is also divided by 4, $T^* = \frac{1}{4}T$; $t_1^* = \frac{1}{4} t_1$. In FIG. 7, the four fractional pieces obtained by subdividing $t_1$ are equally distributed within the time frame T. As a result the complementary time interval $t_2$ used for developing a shorting path is also fractionalized $nt_1^* = t_1$; $nt_2^* = t_2$; $nT^* = T$.

FIG. 8 shows with curves subdividing with n=2, n=3, and n=4, sucessively. Curves (a) there show how the original voltage slice (n=1) is subdivided into two, three, and four subslices equally distributed within the time frame T. Curves (b) show the periods of conduction of the associated pairs of switches $A_1B_2$; $A_1C_2$; $B_1C_2$; etc. in the switching pattern per outputted phase, whereas curves (c) show the "shorting" periods alternately obtained with successive pairs of switches $A_1A_2$, $C_1C_2$, $B_1B_2$, etc. When n=2, the switching pattern for each pair of switches is twice repeated for two consecutive "slicing" and "shorting" time intervals. For n=3, the pattern is repeated three times with each "slicing" pair of switches before going to a subsequent "shorting" pair in the pattern. For n=4 one pair from curves (b) and one pair for curves (c) are alternately repeated four times. Curves (d) show the effect on the current ripple of $i_O$ on the output phase. It appears that, as a result of subdividing the "slices", the frequency of the ripple is increased while the magnitude thereof is much reduced.

Referring to FIG. 9, curves (a) are the phase output currents $i_{01}$, $i_{02}$, $i_{03}$ in the case where $f_0 = \frac{1}{4} f_I$ ($f_O$ fundamental output frequency, $f_I$ fundamental input frequency). (b), (c), (d) are curves showing the conduction periods of the three converter $CV_1$, $CV_2$ and $CV_3$ under the prior art mode of control (n=1) and, according to the invention, when n=4. The switching pattern for the first phase ($CV_1$) is $B_1A_2$, $C_1A_2$, $C_1B_2$, $A_1B_2$, with alternate "shorting" periods caused by the conduction of pairs $A_1A_2$, $C_1C_2$, and $B_1B_2$. Similarly, for the second phase ($CV_2$) the switching pattern in the prior art mode is $A_1C_2$, $B_1C_2$, $B_1A_2$, $C_1A_2$ whereas $C_1C_2$, $B_1B_2$, and $A_1A_2$ are the pairs for "shorting" inbetween. The third phase ($CV_3$) is according to $C_1B_2$, $A_1B_2$, $A_1C_2$, and $B_1C_2$, while pairs $B_1B_2$, $A_1A_2$ and $C_1C_2$ determine the "shorting" paths, successively. Curves (e) show the input current due to energy being drawn from the input power source when each "slice" is being established. The energy is concentrated during the slice, and it is the highest where the voltage $V_A$ is higher. In accordance with the invention, with n=4, the "shorting" period is fractionalized to $\frac{1}{4}$ and spread over the time frame T equally. Thus for $CV_1$ the conductions $B_1A_2$ and $A_1A_2$ at the beginning of the pattern are repeated four times but each during one-fourth of the time. This results in each of the current slices $i_A$ of the left side of curves (e) being split into four subslices spread over the blank spaces, as shown on the right side of curves (e). This is a substantial improvement on the quality of the input current harmonics.

As shown in FIG. 11, for phase 1 and converter $CV_1$ during a first half of time frame $T_1$, driver signal $X_1$ establishes the conduction period $t_{11}$ for switching unit $A_2$ and concurrently driver signal $Y_2$ establishes the conduction period $t_{11}$ for switching unit $B_2$. Thereafter, driver signal $X_1$ on switching unit $A_1$ and driver signal $X_2$ on switching unit $A_2$ establishes the shorting period $t_{21}$. The same control mode is repeated a second time during the second half of the time frame thus $T_1$, for $t_{12}$ and $t_{22}$. Then, the second time frame $T_2$ of the same phase 1 ($CV_1$) takes place with two successive identical switching patterns, driver signal $X_1$ on switching unit $A_2$; $Z_2$ on $C_2$ for "slicing" during $t_{11}$; $Z_1$ on $C_1$ and $Z_2$ on $C_2$ for "shorting" during $t_{21}$. These are repeated during $t_{12}$ and $t_{22}$, respectively. Then it is time frame $T_3$; and so on for time frames $T_4 \ldots t_6$ of the six static switches $A_1$, $A_2$, $B_1$, $B_2$, $C_1$, $C_2$ of converter $CV_1$. Similar combinations of driving signals operating on $CV_2$ and $CV_3$ at 120° phase shift from one converter to the next account for the three phases $\phi_1$, $\phi_2$, $\phi_3$. The table for driver signals $X_1$-$Z_2$ relative to the respective switching units is as follows:

TABLE IV

| Phase | $X_1$ | $Y_1$ | $Z_1$ | $Y_2$ | $Z_2$ | $X_2$ |
|---|---|---|---|---|---|---|
| $\phi_1$ | $Z_1$ | $B_1$ | $C_1$ | $B_2$ | $C_2$ | $A_2$ |
| $\phi_2$ | $C_1$ | $A_1$ | $B_1$ | $A_2$ | $B_2$ | $C_2$ |
| $\phi_3$ | $B_1$ | $C_1$ | $A_1$ | $C_2$ | $A_2$ | $B_2$ |

The generation of signals $X_1$, $Y_1$, $Z_1$, $Y_2$, $Z_2$, $X_2$ could be performed after the teachings of the U.S. Pat. Nos. 3,493,838 and 3,470,447 incorporated by reference, signals $X_1 \ldots Z_2$ being modified to introduce the repetition (n times) and the alternate succession of "slicing" and "shorting" periods of elementary time intervals which are subdivided from what they were in the prior art. A preferred embodiment of the invention, however, is according to the digital scheme illustrated in block diagram on FIG. 12.

Figure 13:
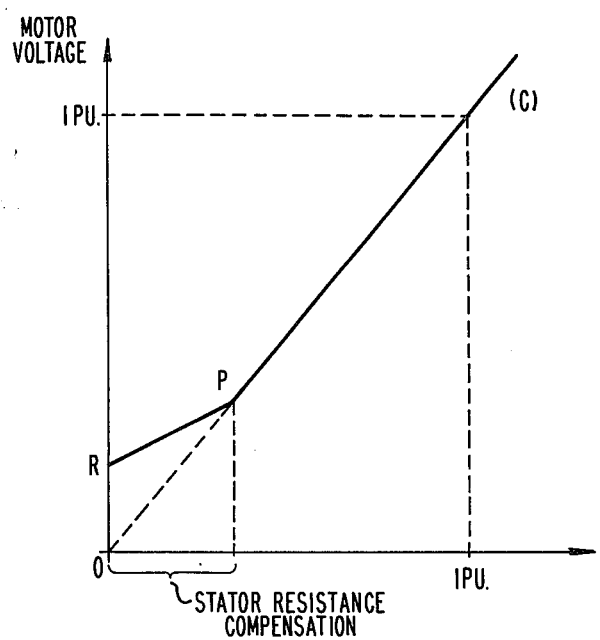
FIG. 13 is a curve illustrating non-linearity in the volt-per-hertz characteristic of an induction motor.

It will be shown that with the proposed digital UFC control, the degree of subdivision n, i.e., the number of subtime frames T* contained in each time frame T, can be readily set for each value of the output frequency. By increasing n with decreasing output frequency $f_O$ (that is, with increasing time frame T), the ripple of the motor current, as well as that of the input supply current, can be kept relatively low over the total output frequency range. The digital approach also facilitates the implementation of a nonlinear output voltage-to-frequency control function required for a practical AC motor drive. FIG. 13 shows an example of such an output voltage-frequency relationship for an AC motor. As shown in FIG. 4, the switching pattern provides an output voltage wave $V_O$ having a "wanted" fundamental $V_F$ with a frequency $f_O$ (the difference between the input frequency $f_I$ of the input AC power source and the repetition rate of the switching pattern). The characteristic curve (c) of FIG. 13 shows the motor voltage ($V_F$) as a function of the frequency ($f_O$) for a motor rating of one per unit (P.U.). It is linear most of the time except at very low frequencies. In the latter region RP, the motor voltage is non-linearly increased to compensate for the voltage drop across the stator winding resistance in order to maintain constant volts-per-hertz, and thereby maintain constant airgap flux in the motor.

The digital approach has an additional advantage in that it allows the linearization of the relationship between the magnitude of the fundamental component of the output voltage $V_F$ and the duration of the active conduction period, $t_1$, at no additional circuit complexity. The following mathematical equation expresses the cosine relationship between the time interval $t_1$ and the amplitude of $V_F$.

$$V_F = \frac{6V_L}{\pi}\left[\cos\left(\frac{\pi}{3} + \frac{\pi(T - t_1)}{6}\right)\right]\cos 2\pi f_C t$$

where $V_L$ is the line-to-line AC input voltage and t is time. This expression is linearized by relating $t_1$ to the time frame T so that the amplitude of $V_F$ varies linearly with the output frequency $f_O$. It is understood, however, that a relationship other than linear may be chosen if appropriate.

Figure 12:
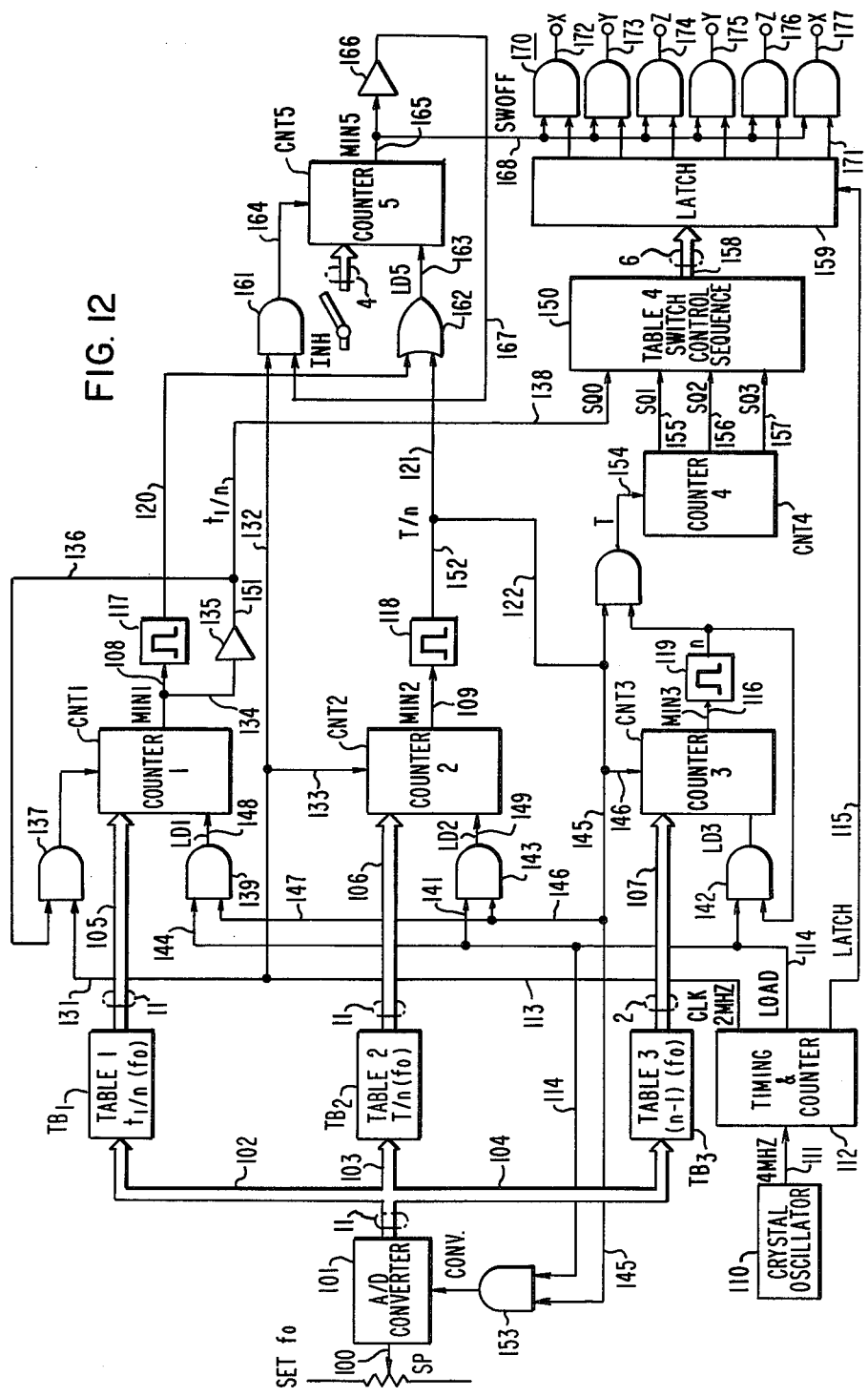
FIG. 12 is a block diagram of a control circuit permitting digital treatment in the generation of driver signals in accordance with the invention.

According to the proposed implementation of the UFC control circuit for an AC motor drive, as illustrated by FIG. 12, two basic circuit techniques are applied in the control, which make it possible to use medium and large scale integrated circuit elements available on the market, in order to reduce component count and increase reliability. All functional relationships between variables are defined by "look-up tables" stored in tables $TB_1$, $TB_2$ and $TB_3$. All timed events are derived from the basic time period of a crystal oscillator 110 by counters $CNT_1$ associated with table $TB_1$, $CNT_2$ associated with table $TB_2$ and $CNT_3$ associated with table $TB_3$.

The output voltage is defined digitally in terms of voltage slices $t_1/n$, as a function of the output frequency $f_O$. Digital values thereof are listed in a table ($TB_1$). Thus table $TB_1$ contains digital data representing ordered pairs of independent (input) variables and dependent (output) variables. These data are given the resolution required for the particular AC motor drive application. Such a "look-up table" is implemented with an electronic memory circuit comprised of an array of memory cells of M rows, N columns. Each such cell contains a two-valued (binary) information bit. The cells are organized in M groups of N cells each. Each group represents a memory location of N cells. It contains an N-bit binary number. Values of the independent variable are assigned to such separate memory locations that store the corresponding values of the dependent variable. Applying the binary coded values of the independent variable as addresses to the memory circuits gives in turn access to the specific memory locations where the corresponding values of the dependent variable are stored. The latter will appear on the output data ports of the memory. The process described constitutes the "table look-up", e.g. on lines 105 from $TB_1$ to counter $CNT_1$, on lines 106 from $TB_2$ to counter $CNT_2$ and on lines 107 from $TB_3$ to counter $CNT_3$. The electronic memories used are programmable read-only memory (PROM) integrated circuits that retain the stored values of variables permanently.

For a variable-speed UFC type AC motor drive control (independent input variable) the output frequency $f_O$ is defined externally by a reference voltage level (SP on FIG. 1), the magnitude of which is proportional to the required frequency. Such continuously variable analog reference voltage SP derived on 100 is converted to binary coded digital data by an analog-to-digital (A/D) converter 101. The A/D converter is capable of generating on lines 102 to table 1 ($TB_1$) output codes of 11 binary digits minimum. This provides the required resolution for an output frequency range of, for example, 0 Hz to 120 Hz, a resolution of less than 0.06 Hz. The significance of having this high resolution is that the instantaneous change of torque of the motor in response to a step-wise change of the stator frequency will remain under ten percent of the rated torque, even for a motor having a rated torque produced at a very low slip frequency of one percent (0.6 Hz) of the rated frequency (60 Hz). The A/D converter 101 has to complete the conversion of each sample of the output frequency reference voltage SP into digital data words within the shortest basic time frame T. This requirement defines the rate at which the system can update the output frequency. Time frame T is related to the output frequency by the equation $$T = \frac{1}{6(f_I + f_O)}$$

which, in the case of f=60 is $$T = \frac{1}{360 + 6F_O}$$

for a three-phase bridge type UFC. For the maximum output frequency of $f_O=120$ Hz at $f_I=60$ Hz, T=0.9259 millisecond. An 11 bit A/D converter working on the successive approximation principle of conversion satisfies such resolution and conversion speed requirements.

The digital output frequency data of line 102 to table $TB_1$ is also used via lines 103 and 104 to define with two other look-up tables $TB_2$, $TB_3$ quantities needed by the control for the generation of the switch control signals $X_1$, $X_2$, $Y_1$, $Y_2$, $Z_1$, $Z_2$. While table $TB_1$ provides values of the subdivided active conduction period, $t_1/n$, table $TB_2$ provides the subdivided basic time frame $T/n$, and table $TB_3$ provides the degree of subdivision, n. The sizes of the memories (MXN) for Tables $TB_1$, $TB_2$, $TB_3$ are defined by the required resolution of both the input $f_O$ and the stored variables. The input variable $f_O$ on lines 102, 103 and 104 is an 11-bit quantity forming an 11 binary address to each memory, that is, there are $2^{11} = 2048$ distinct values of the frequency $f_O$ that require $M = 2048$ (2K) memory locations for each table to store the corresponding M binary values of each output variable. The number of memory cells N of each location is defined by the required resolution of the output variable. Variable $T/n$ contained in table $TB_2$ is the time period that defines the output frequency of the UFC.

Figure 14:
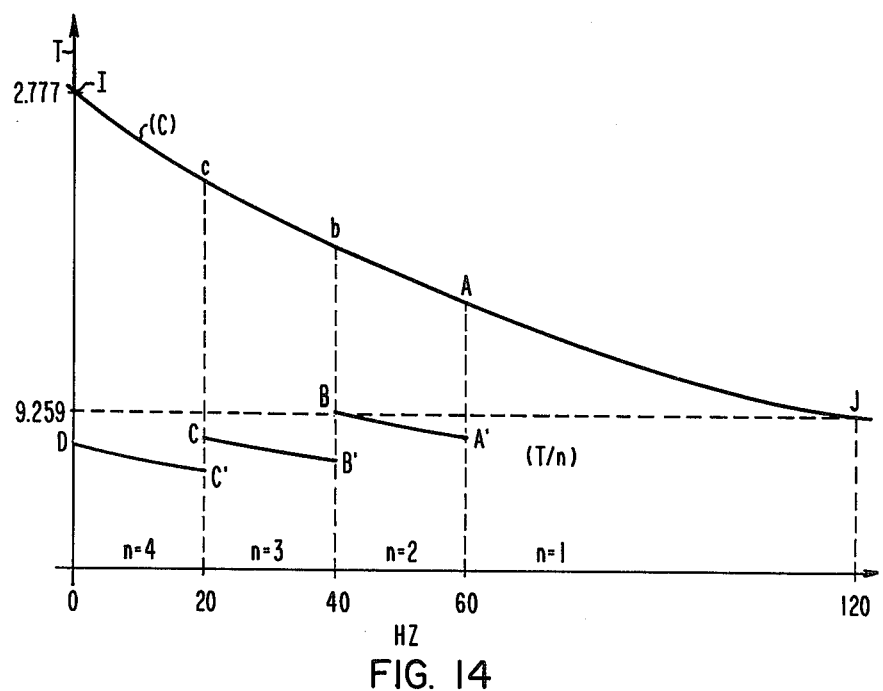
FIG. 14 shows with curves how look-up tables are made for table $TB_2$ of FIG. 12.

Referring to FIG. 14, assuming the AC power source for the converters $CV_1$, $CV_2$, $CV_3$, is at a frequency $f_I = 60$ Hz, the time frame of duration T for n = 1 is given by the formula $T = 1/360 + 6f_O$. If the operative range of the motor is from 0 to 120 Hertz, the value of T for $f_O = 0$ is $T = 1/360 = 2.777$ ms. which is the ordinate of I on curve (c). For $f_O = 120$ hertz, $T = 1/360 + 720 = 0.9259$ ms which is the ordinate of J on curve (c) at the opposite end of the operative range. Curve (c) is T as a function of $f_O$. According to the present invention, when the speed of the motor has been reduced down to 60 hertz, the value of n is charged to n = 2. Point A on curve (c) for 60 Hz corresponds to $T = 1/360 + 360 = 1.388$ ms. When n becomes n = 2, T becomes T/2, therefore, the operative point passes from A to A', the latter having half the magnitude of the ordinate of A. When $f_O$ decreases from 60 to 40 Hz, the characteristic goes from $A_1$ to B with all operative points at T/2 from curve (c). At point B again, n goes from 2 to 3 and T/2 becomes T/3. The curve followed for n = 3 is B'C with all operative points at T/3 from curve (c), $f_O$, goes from 40 to 20 Hz. The ordinate of B' is $\frac{1}{3}$ of the ordinate of b on the (c) characteristic. Again when the speed is further reduced and crosses the 20 Hz point, n becomes n = 4, and T/3 becomes T/4. The new characteristic is C'D where C' has an ordinate which is $\frac{1}{4}$ of the ordinate of T on characteristic (C) for $f_O = 20$, and all further operative points follow T/4 from curve (c). Table $TB_2$ contains all the values from J to A, from A' to B, from B' to C, from C' to D with, as explained above, a resolution of $120/2048 = 0.06$ Hz from one digital data to the next. It is observed indeed that the range of 40 to 60, 20 to 40 and 0 to 20 for n = 2, 3, 4, respectively, are merely illustrative. n does not need to go to all those values, and not merely those values. Besides, a change of integer n may take place as desired, or as practical in the frequency range. In order to resolve a frequency increment $\Delta f_O = 0.06$ Hz, the basic time frame $T = 1/6f_I = 1/360$ has to be resolved to 2.8 microseconds, at very low frequencies. ($\Delta T = -6T^2 \Delta f_O$; $\Delta T = -47^{10-4} \Delta f_O$ for $f_O = 0$). Since at near zero frequencies the number of subdivision of the basic time frame is n = 4, the T/n quantity has to be resolved to $\Delta T/n \leq 0.7$ microsecond. Selecting a clock frequency of 2 MHz (having a period of $\tau = 0.5$ microsecond) the above resolution requirement can be satisfied. This is achieved with a crystal oscillator 110 of 4 MHZ controlling a timing circuit 112 outputting on line 113a clock signal of 2 MHz. Frequency resolution of $\Delta f_O \leq 0.1$ Hz will be achieved at the maximum frequency of $f_O = 120$ Hz with n = 1 ($\Delta f_O = -1.944 \cdot 10^5 \Delta T$, for $f_O = 120$ Hz) using the 2 MHz clock frequency. The values of the subtime frame T/n from table $TB_2$ are in the range of $T/n = 0.6944$ millisecond (at $f_O = 0$ Hz and n = 4) to $T/n = 0.9259$ millisecond (at $f_O = 120$ Hz and n = 1), or $$\frac{694.4 \times 10^{-6}}{.5 \times 10^{-6}} \quad 1389 \text{ and } \quad \frac{925.9 \times 10^{-6}}{.5 \times 10^{-6}} \quad 1852$$

time units (one time unit is $\tau = 0.5$ microsecond with the clock frequency of 2 MHz), respectively. The range of values of the subtime frames T/n expressed in terms of the time units of the crystal clock 110 are stored in Table 2 in binary form. Table 2 ($TB_2$) is a memory having N = 11 bit wide locations ($2^{11} = 2048 > 1852$).

Similar considerations can be applied to the memory size required for Table 1 storing the binary coded values of the subdivided active time period $t_1/n$.

FIG. 15 shows the characteristic (C') representing the active period $t_1$, e.g. control in order to compensate for constant airgap flux according to FIG. 13. Curve (C') is deducted from curve (c) of FIG. 14 by correction with a multiplication factor $f_O/120$ so that at any instant $V_F$, the output voltage, is equal to the maximum voltage $V_{max} \times f_O/120$. Thus at frequency 60 Hz, the operative point of (C') is K at half the magnitude of k on curve (c). Similarly, at 40 Hz = $\frac{1}{3}$ of 120 Hz, the operative point L is at $\frac{1}{3}$ of the ordinate of point l on curve (c). For 20 Hz = 1/6 of 120 Hz, the ordinate M on curve (C') is 1/6 the ordinate of m of curve (c). From frequency p, typically 15 Hz, the non-linear compensation indicated in FIG. 13, causes the operative point P of curve (C') to be followed by a mounting curve, rather than going to zero. The $t_1/n$ characteristic according to the present invention is derived from curve (C') by introducing fractionalizing by 1/n at frequencies 60 (where n goes to n = 2), 40 (where n goes to n = 3) and 20 (where n goes to n = 4). Thus, K' is at half the ordinate of K, whereas L' is at $\frac{1}{3}$ the ordinate of L and M' is at $\frac{1}{4}$ the ordinate of M. A look-up table representing discrete digital values of the $t_1/n$ characteristic (JK, K'L, L'M, M'N) is stored in table $TB_1$. Indeed in FIG. 15 like in FIG. 14, values 60 Hz, 40 Hz, 20 Hz and 120 Hz are for the purpose of illustration only. The advantages of practicing the invention, e.g. by defining zones in the speed ragne where n = 2, 3 or 4, are obtained at chosen ranges for n and with so many such ranges as desired, or practical.

The maximum values of $t_1/n$ approaches the values of T/n at the maximum output frequency ($f_O = 120$ Hz, n = 1) when the full output voltage obtainable from the UFC is required. The memory size for storing the values of $t_1/n$ as a function of the output frequency $f_O$ is again M = 2K, N = 11. It is also evident that the worst case resolution of the output voltage is one part in 1389 ($\Delta V_F < 0.07\%$) at output frequencies approaching 0 Hz, using 11 bits of binary storage.

The numerical value of the degree of subdivision n of the basic time frames for the proposed motor drive defines the number of times the T/n subtime frame is repeated to complete a full T basic time frame. For n = 1, 2, 3, 4, the values (n - 1) = 0, 1, 2, 3, are stored into Table 3 ($TB_3$). The memory size required for Table 3 is M = 2K (2048 locations assigned to the output frequency range of 11 bits) and N = 2 hereby to be able to store the four valued (n - 1) factor.

The three quantities $t_1/n$, T/n and (n - 1) obtained from locations in the Tables addressed by the $f_O$ input variable, are used as "preload" values for three binary down-counters CNT 1, CNT 2 and CNT 3, respectively. Presetting is via line 105 for $CNT_1$ from $TB_1$, via line 106 for $CNT_2$ from $TB_2$, and via line 107 for $CNT_3$ from $TB_3$. The counters preloaded to such given binary value, for example, say B, will require B number of clock cycles to reach a cleared state e.g. a state for which the counter contains zero binary value in all stages. The counting-down time periods will, therefore, last $B.\tau$ seconds at the end of which the MIN (minimum count) signal of the counter becomes true (high logic level). The first counter CNTR 1 preloaded with $t_1/n$ will time out the active conduction subperiods. The second counter CNTR 2 preloaded with T/n will time out the subtime frames. The third counter CNT 3 preloaded with (n−1) will count the number of consecutive subtime frames T/n required for each basic time frame T at the output frequency $f_O$ ($F_O = 1/6T - f_I$) being generated by the converter.

From the above description of operating mode of the three counters, it is evident that starting from the preloaded state of the three counters at time zero the MIN 1, MIN 2, and MIN 3 counter status indicator signals expressed logically by ON/OFF device 117 for MIN 1 (line 108), ON/OFF device 118 for MIN 2 (line 109) or ON/OFF device 119 for MIN 3 (line 116) generally not true (low logic level). Thus, MIN 1 of line 108 can only be true at time zero when zero output voltage is required and the $t_1/n$ active time period is correspondingly zero. MIN 3 of line 109 is true at high output frequencies when (n−1)=0. During the countdown period, the MIN signals stay at low level. When a counter reaches the cleared state, the MIN signal level of that counter becomes high marking the end of the time period generated by that counter. Therefore, signal MIN 1 is at logic low level (zero) during the active conduction periods $t_1/n$, at high logic level (one) during the shorting periods $t_2/n$. Signal MIN 2 goes high (is a one) at the end of each T/n subtime frame. The signal MIN 3 goes high at the end of each n subtime frame, when the end of the basic time frame is reached. The three counters CNT1, CNT2, CNT3 are controlled by the LOAD signal of line 114 and the CLK pulse of line 113 generated by the Timing and Control Logic 112. The timing of the counter signals MIN 1, MIN 2, MIN 3 are shown in FIG. 16 by reference to the clock and load pulses.

As previously discussed, the proposed mode of UFC operation requires the static power switches $A_1$, $A_2$, $B_1$, $B_2$, $C_1$, $C_2$ of each phase to be operated in a defined sequence of patterns that repeats after each 6th basic time frame T (see Table IV). The combination of conducting switch pairs ($A_1,B_2$) for both connecting the input power to the load (active periods) and of switch pairs ($A_1$, $A_2$, $C_1$, $C_2$, . . . ) shorting the load (passive periods) stays the same during a particular basic time frame T. It varies however from frame to frame through the six ($T_1$ through $T_6$) basic time frames. Within each basic time frame, switches ($A_1,B_2$) conducting for an active subperiod and switches ($A_1,A_2$) . . . conducting for a passive subperiod are alternately selected. At each transition from one active to a passive subperiod, a nonconductive time period is inserted to allow for the nonzero switching times of the static power switches involved. This nonconductive time period is provided by switch INH operative on counter CNT5.

From the description of the switching sequences it follows that the active/passive periods and the sequence number of the basic time frames define the switch activation pattern at any time instant. Taking the set of coincident logic values of the above parameters as input data words and the corresponding set of activation states of the 6 switches (3 of the 18 switches of a three phase balanced set have identical activation states in the converter) as output data words, the switch pattern generator logic 150 is implemented using another look-up table like the afore-mentioned Table 4.

Using a binary counter CNTR 4 clocked at the end of each basic time frame T is generated a three bit combination of logic signals SQ1, SQ2, SQ3 in binary code expressing the sequence number of the six basic time frames to be generated. These three logic signals add to the SQ0 signal of line 138 from counter CNT 1, representing the active (logic high) and passive (logic low) time periods. Those four signals of line 138, 155, 156, 157 form a four-bit address code to the memory of Table 4. The size of the switch sequence memory in circuit 150 is $M = 16$ ($2^4 = 16$) × $N = 6$(6 bits are needed to define the six distinct activation states of the 18 switches of the UFC according to FIG. 11. The six bit wide output data of the memory 150, which is addressed by the timing states $SQ_0$, $SQ_1$, $SQ_2$, $SQ_3$, are the $X_1$, $X_2$, $Y_1$, $Y_2$, $Z_1$, $Z_2$ switch activation signals of lines 172–176, respectively. These signals (logic levels) are first stored in an output latch 159. When outputted they are applied to the isolating distribution amplifiers, via the output gated drivers as well known. The gated drivers serve the purpose of inhibiting the activation of the oncoming static switches prior to the decay of the currents in the switches being turned off. By line 168 a SWOFF signal is provided at low level during the time (typically 5 microsecond) the CNT 5 counter counts down the preset value of the inhibit switch INH. The binary INH code logic is selected to match the switching time tolerances of the actual static switching devices (gate-turn-of devices or GTOs) used as bilateral power switches.

We claim:

1. In a frequency conversion apparatus having a plurality of phase-related static converters each coupled between a polyphase AC power source of frequency $f_{IN}$ and a polyphase AC output power supply of frequency $f_o$; including:

for each of said converters a plurality of controllable bilateral switching units controlled for conduction in succession during a time period (TP) characterizing said frequency $f_o$, each switching unit having a controllable conduction time interval (t) within a common time frame T defined by a controllable repetition rate, and occurring through said succession at said repetition rate to derive energy from said AC power source through the associated converter during successive segments of voltage, on a phase basis, and to apply the derived voltage segments of said succession to said AC output power supply so as to form with associated like pluralities of converter switching units said AC polyphase output power supply;

the frequency $f_o$ of said AC output power supply being a function of the difference between the frequency $f_{IN}$ of said AC power source and said repetition rate; the combination of:

means synchronized with said repetition rate and operative on said controllable conduction time interval (t) for establishing with said succession of switching units n elementary conduction time intervals (t*) distributed throughout the time frame (T) of operation of each switching unit in said succession and occurring at a rate which is n times said repetition rate, the sum of said elementary conduction time intervals (t*) within such time frame (T) being equal to said controllable conduction time interval (t) n being an integer in relation to the output frequency of said AC power supply; and means for controlling the switching units of said succession each one n times before controlling another; thereby to improve the quality of the current in the output AC power supply and in the input AC power source.

2. The frequency conversion apparatus of claim 1 with said n establishing means comprising:

first memory means for storing a digital representation of electrical angles of said AC power source representing (t/n) for each switching unit of said succession as a function of the intended output frequency $f_O$;

second memory means for storing a digital representation of electrical angles of said AC power source representing (T/n) for each switching unit of said succession as a function of the intended output frequency $f_O$;

third memory means for storing a digital representation of electrical angles of said AC power source representing (n−1) occurrences of one switching unit in said succession as a function of the intended output frequency $f_O$;

with said synchronized means including:

first counter means responsive to said first memory means and to said repetition rate for establishing n successive time intervals (t/n);

second counter means responsive to said second memory means and to said repetition rate for establishing n successive time intervals T/n;

third counter means responsive to said third memory means and to said repetition rate for establishing each of successive time intervals T;

with said controlling means including distributor means responsive to a concurrence of operation of said first, second and third counter means for repetitively controlling each switching unit of said succession.

3. The apparatus of claim 2 with said switching units in each succession being associated by pairs for conduction during such said (t/n) conduction time intervals, and associated by pairs between two consecutive such (t/n) conduction time intervals for shorting the current path from said AC power source;

said first counter means determining the alternance of conduction and shorting time intervals;

said second counter means determining the repetition of said alternance according to integer n;

said distributor means determining said conduction and said shorting pairs of switching units in said succession of switching units.

4. The apparatus of claim 3 with the load being an induction motor, said digital representations of said first memory means being representative of a time interval t/n as a function of the output frequency $f_O$ such that a constant ratio is maintained between the output AC voltage and the output frequency of the AC power supply.

* * * * *